(12) United States Patent
Mueller et al.

(10) Patent No.: US 7,399,251 B2
(45) Date of Patent: Jul. 15, 2008

(54) TWO-SPEED TRANSFER CASE

(75) Inventors: Joseph G. Mueller, Ballston Spa, NY (US); Aaron Ronk, Lake George, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 396 days.

(21) Appl. No.: 11/301,085

(22) Filed: Dec. 12, 2005

(65) Prior Publication Data

US 2006/0128515 A1 Jun. 15, 2006

Related U.S. Application Data

(63) Continuation-in-part of application No. 11/124,868, filed on May 9, 2005, now Pat. No. 7,033,300, which is a continuation of application No. 10/720,654, filed on Nov. 24, 2003, now Pat. No. 6,929,577.

(51) Int. Cl.
*F16H 37/08* (2006.01)

(52) U.S. Cl. .................... 475/295; 475/204

(58) Field of Classification Search .............. None
See application file for complete search history.

(56) References Cited

U.S. PATENT DOCUMENTS

| | | | |
|---|---|---|---|
| 4,805,486 A | 2/1989 | Hagiwara et al. | |
| 4,895,236 A | 1/1990 | Sakakibara et al. | |
| 4,950,214 A | 8/1990 | Botterill | |
| 5,007,886 A | 4/1991 | Holmquist et al. | |
| 5,080,640 A | 1/1992 | Botterill | |
| 5,323,871 A | 6/1994 | Wilson et al. | |
| 5,352,164 A | 10/1994 | Bensinger et al. | |
| 5,363,938 A | 11/1994 | Wilson et al. | |
| 5,407,024 A | 4/1995 | Watson et al. | |
| 5,423,235 A | 6/1995 | Botterill et al. | |
| 5,520,590 A | 5/1996 | Showalter et al. | |
| 5,522,776 A | 6/1996 | Alvey | |
| 5,655,986 A | 8/1997 | Wilson et al. | |
| 5,771,477 A | 6/1998 | Showalter et al. | |
| 5,867,092 A * | 2/1999 | Vogt | 340/456 |
| 6,001,041 A | 12/1999 | Sawase et al. | |

(Continued)

FOREIGN PATENT DOCUMENTS

DE    3908478 A1    10/1989

(Continued)

*Primary Examiner*—Sherry Estremsky
(74) *Attorney, Agent, or Firm*—Harness, Dickey & Pierce, P.L.C.

(57) ABSTRACT

A transfer case includes a two-speed range unit, a mode clutch, an actuation mechanism and a control system. The actuation mechanism includes an electric motor, an actuator shaft driven by the motor, a range actuator assembly and a mode actuator assembly. The range actuator assembly includes range, a cam driven by the actuator shaft and a shift fork having a follower retained in a groove formed in the cam and a fork engaging a shift collar associated with the range unit. The mode actuator assembly has a range cam member with cam surfaces and a control gear with rollers engaging the cam surfaces. The control gear is rotatively driven by the actuator shaft. The cam member is axially moveable for controlling engagement of the mode clutch. An anti-rotation mechanism limits rotation of the cam member in response to continued rotation of the control gear.

30 Claims, 25 Drawing Sheets

U.S. PATENT DOCUMENTS

| | | | |
|---|---|---|---|
| 6,099,430 A * | 8/2000 | Winks | 475/204 |
| 6,173,624 B1 * | 1/2001 | Decker | 74/473.37 |
| 6,203,465 B1 | 3/2001 | Showalter | |
| 6,230,577 B1 | 5/2001 | Showalter et al. | |
| 6,296,590 B1 | 10/2001 | Gassmann | |
| 6,367,344 B1 | 4/2002 | Vogt et al. | |
| 6,398,686 B1 | 6/2002 | Irwin | |
| 6,405,822 B1 | 6/2002 | Lee | |
| 6,484,857 B2 | 11/2002 | Vonnegut et al. | |
| 6,503,167 B1 | 1/2003 | Sturm | |
| 6,568,519 B2 | 5/2003 | Lovatt | |
| 6,905,436 B2 | 6/2005 | Mueller et al. | |
| 2002/0142877 A1 | 10/2002 | Williams et al. | |
| 2003/0192401 A1 | 10/2003 | Thomas et al. | |
| 2004/0020700 A1 * | 2/2004 | Watson et al. | 180/247 |
| 2004/0162176 A1 * | 8/2004 | Foster | 475/210 |
| 2004/0173428 A1 * | 9/2004 | Bowen | 192/84.6 |
| 2005/0159264 A1 * | 7/2005 | Puiu et al. | 475/198 |
| 2007/0023252 A1 * | 2/2007 | Sachsenmaier et al. | 192/84.6 |
| 2007/0175286 A1 * | 8/2007 | Oliveira et al. | 74/335 |

FOREIGN PATENT DOCUMENTS

| | | |
|---|---|---|
| JP | 2-18117 | 1/1990 |
| JP | 3-66927 | 3/1999 |

* cited by examiner

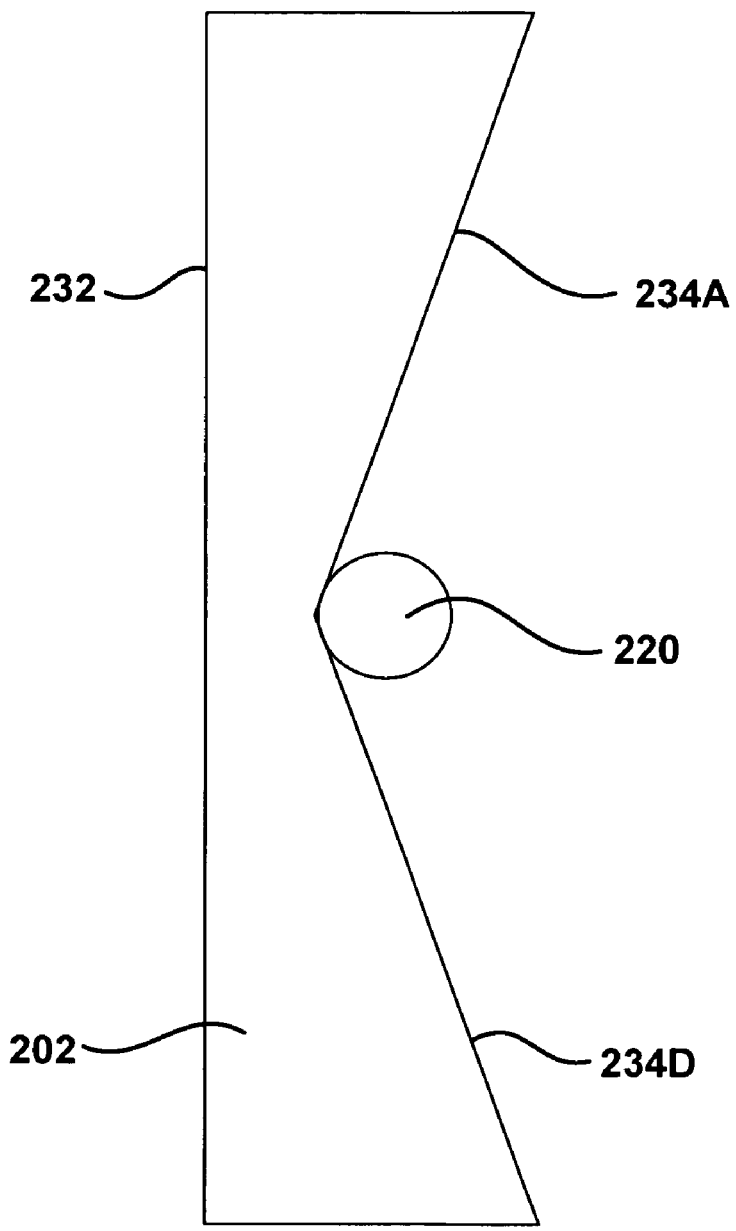

TWO-SPEED TRANSFER CASE

CROSS-REFERENCE TO RELATED APPLICATIONS

This application is a continuation-in-part of U.S. patent application Ser. No. 11/124,868 filed May 9, 2005, now U.S. Pat. No. 7,033,300, which is a continuation of U.S. patent application Ser. No. 10/720,654 filed Nov. 24, 2003, now U.S. Pat. No. 6,929,577.

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications having a power-operated clutch actuator that is operable for controlling actuation of a multi-plate friction clutch assembly.

BACKGROUND OF THE INVENTION

In view of increased consumer popularity in four-wheel drive vehicles, a plethora of power transfer systems are currently being utilized in vehicular driveline applications for selectively directing power (i.e., drive torque) from the powertrain to all four wheels of the vehicle. In many power transfer systems, a transfer case is incorporated into the driveline and is operable in a four-wheel drive mode for delivering drive torque from the powertrain to both the front and rear wheels. Many conventional transfer cases are equipped with a mode shift mechanism that can be selectively actuated to shift between a two-wheel drive mode and a part-time four-wheel drive mode. In addition, many transfer cases also include a range shift mechanism which can be selectively actuated by the vehicle operator for shifting between four-wheel high-range and low-range drive modes.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a multi-plate clutch assembly and a power-operated clutch actuator that is interactively associated with an electronic control system and a sensor arrangement. During normal road conditions, the clutch assembly is typically maintained in a released condition such that drive torque is only delivered to the rear wheels. However, when the sensors detect a low traction condition, the clutch actuator is equipped for engaging the clutch assembly to deliver drive torque "on-demand" to the front wheels. Moreover, the amount of drive torque transferred through the clutch assembly to the non-slipping wheels can be varied as a function of specific vehicle dynamics, as detected by the sensor arrangement. This on-demand clutch control system is also used in full-time transfer cases to automatically bias the torque ratio across an interaxle differential.

In some two-speed transfer cases the range shift mechanism and the clutch assembly are independently controlled by separate power-operated actuators. For example, U.S. Pat. No. 5,407,024 discloses a two-speed range shift mechanism actuated by an electric motor and a clutch assembly actuated by an electromagnetic ballramp unit. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven sector having cam surfaces adapted to coordinate actuation of the range shift mechanism and the clutch assembly for establishing a plurality of distinct two-wheel and four-wheel drive modes. Examples of other transfer cases equipped with a single power-operated actuator for controlling coordinated engagement of the range shift mechanism and the clutch assembly are disclosed in U.S. Pat. Nos. 6,645,109; 6,783,475; and 6,802,794.

While transfer cases equipped with such coordinated actuation systems have been commercially successful, a need exists to develop alternative clutch actuation systems which further reduce the cost and complexity of two-speed actively-controlled transfer cases.

SUMMARY OF THE INVENTION

Accordingly, it is an objective of the present invention to provide a transfer case equipped with a two-speed range unit, a mode clutch assembly and a power-operated actuation mechanism for controlling coordinated actuation of the range unit and the mode clutch assembly.

It is another objective of the present invention that the transfer case be interactively associated with a control system for controlling operation of the power-operated actuation mechanism to establish various four-wheel high-range and low-range drive modes.

According to a preferred embodiment, a transfer case is provided with a two-speed range unit, a mode clutch assembly, a power-operated actuation mechanism and a control system. The range unit includes a planetary gearset driven by an input shaft and a dog clutch for releasably coupling one of the input shaft and an output component of the planetary gearset to a first output shaft. The mode clutch assembly includes a friction clutch operably installed between the first output shaft and a second output shaft. The power-operated actuation mechanism includes an actuator shaft driven by an electric motor, a range actuator assembly and a mode actuator assembly. The range actuator assembly includes a range cam driven by the actuator shaft and a shift fork disposed between the range cam and the dog clutch. Rotation of the range cam results in translational movement of the dog clutch between high-range (H), neutral (N) and low-range (L) positions. The mode actuator assembly includes a roller cam unit having a cam member with cam surfaces and a control gear with rollers engaging the cam surfaces. The cam member is axially moveable for controlling engagement of the friction clutch. The control gear is rotatively driven by the actuator shaft for initially causing concurrent rotation of the cam member. This initial rotary non-translational movement of the cam member permits sufficient rotation of the actuator shaft to move the dog clutch between its three range position while the friction clutch is maintained in a disengaged state. An anti-rotation mechanism inhibits continued rotation of the cam member in response to continued rotation of the control gear for causing translational non-rotary movement of the cam member, due to engagement of the rollers with the cam surfaces, thereby causing engagement of the friction clutch. The control system is adapted to control the magnitude and direction of rotary motion of the actuator shaft through controlled energization of the electric motor.

The power-operated actuation system of the present invention is arranged to permit sufficient bi-directional rotation of the actuator shaft to cause movement of the dog clutch between its H and L range positions without causing the roller cam unit to engage the friction clutch. However, once the dog clutch is positively located in either of the H or L range positions, continued rotation of the actuator shaft causes actuation of the roller cam unit for generating and applying the clutch engagement force to the friction clutch.

BRIEF DESCRIPTION OF THE DRAWINGS

Further objects, features and advantages of the present invention will become apparent from analysis of the following written specification including the appended claims, and the accompanying drawings in which:

FIG. 7 is a side view of a roller ramp associated with a mode actuator assembly;

DETAILED DESCRIPTION OF THE PREFERRED EMBODIMENTS

Figure 1:
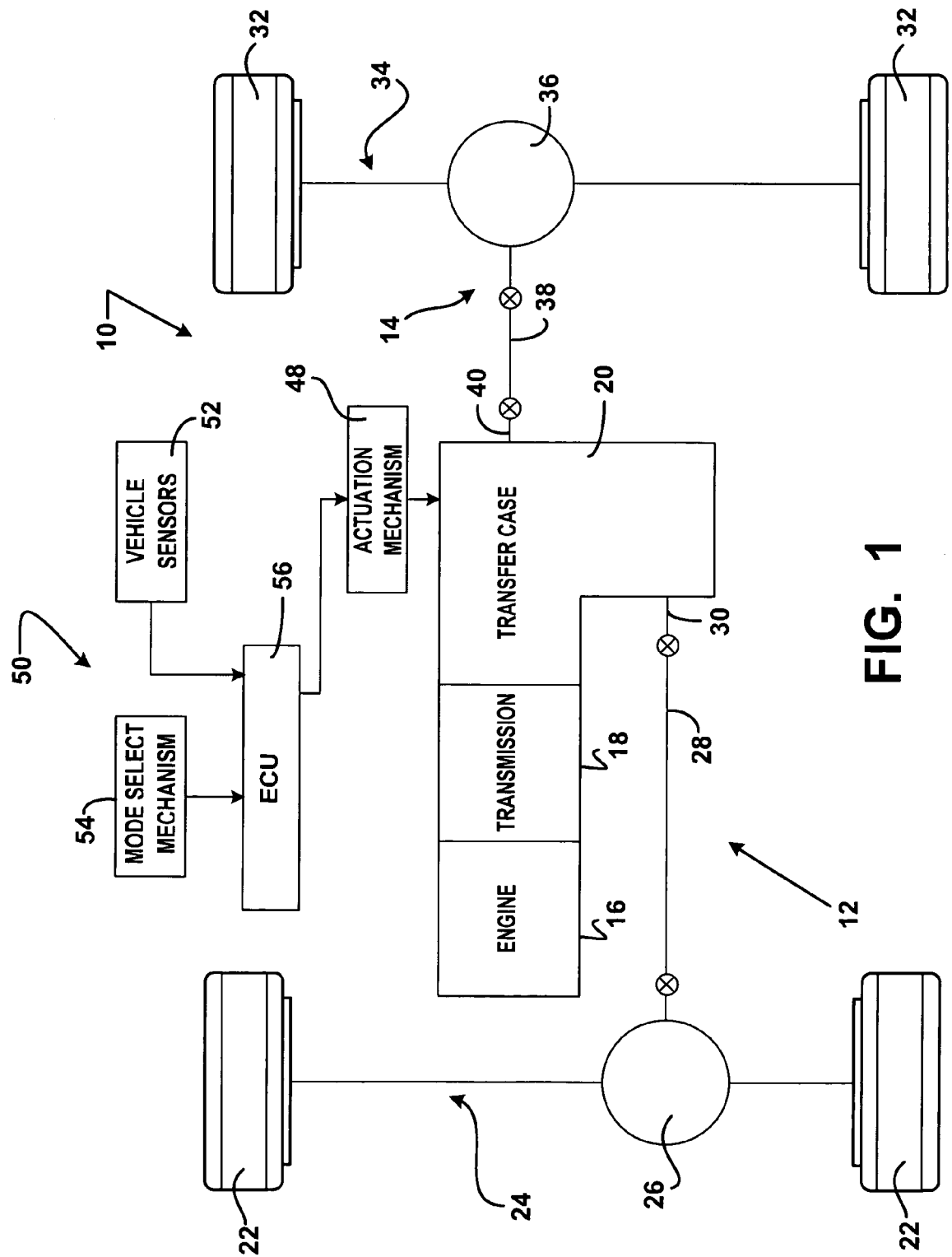
FIG. 1 is a schematic view of a four-wheel drive vehicle equipped with a transfer case and a control system according to the present invention.

Referring now to the drawings, a four-wheel drive vehicle 10 is schematically shown to include a front driveline 12, a rear driveline 14, and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front driveshaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear driveshaft 38, the opposite end of which is interconnected to a rear output shaft 40 of transfer case 20.

As will be further detailed, transfer case 20 is equipped with a two-speed range unit 42, an interaxle differential 44, a mode clutch assembly 46 and a power-operated actuation mechanism 48 operable to control coordinated shifting of range unit 42 and adaptive engagement of mode clutch assembly 46. In addition, a control system 50 is provided for controlling actuation of actuation mechanism 48. Control system 50 includes vehicle sensors 52 for detecting real time operational characteristics of motor vehicle 10, a mode select mechanism 54 for permitting the vehicle operator to select one of the available drive modes, and an electronic control unit (ECU) 56 that is operable to generate electric control signals in response to input signals from sensors 52 and mode signals from mode select mechanism 54. The control signals are sent to an electric motor assembly 58 associated with actuation mechanism 48.

Figure 2:
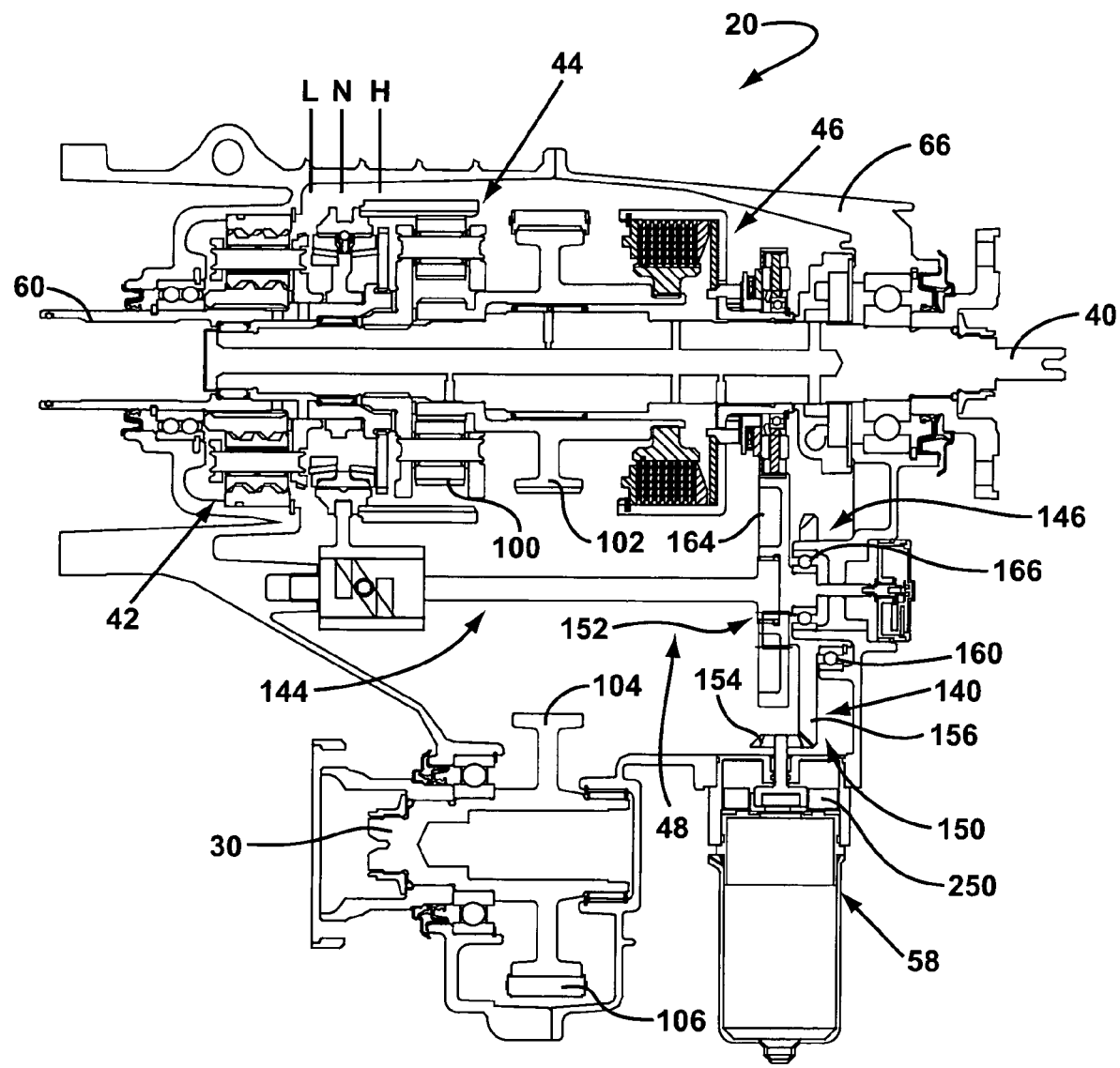
FIG. 2 is a sectional view of a two-speed full-time transfer case constructed in accordance with one embodiment of the present invention.
Figure 3:
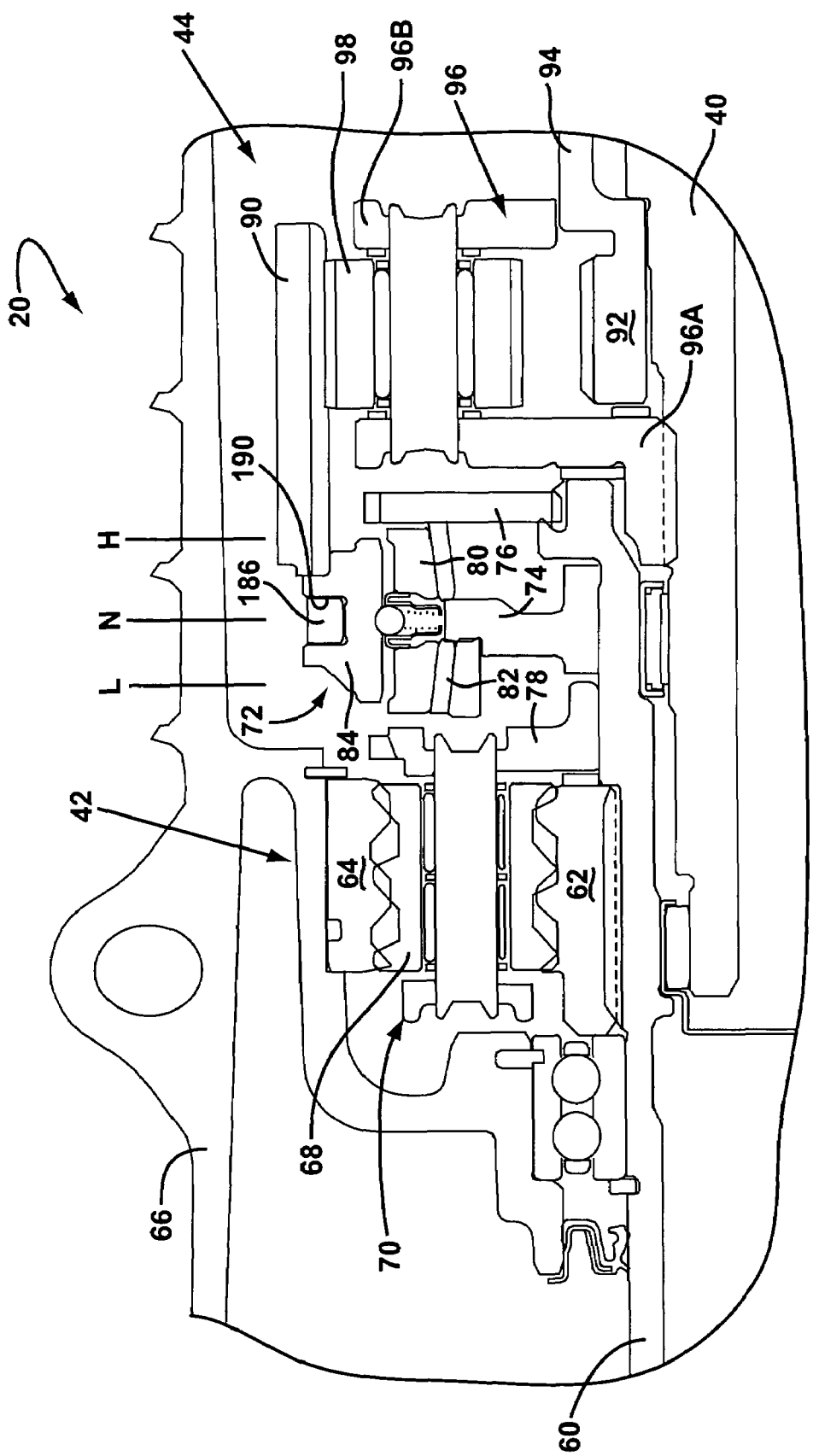
FIGS. 3 through 5 are enlarged partial views of FIG. 2 showing various components of the transfer case in great detail.

With particular reference to FIGS. 2 and 3, transfer case 20 is shown to include an input shaft 60 adapted to be driven by the output shaft of transmission 18. Range unit 42 includes a planetary gearset having a sun gear 62 driven by input shaft 60, a ring gear 64 non-rotatably fixed to a portion of a housing 66 and planet gears 68 rotatably supported from a planet carrier 70 and which are meshed with both sun gear 62 and ring gear 64. Range unit 42 further includes a synchronized dog clutch assembly 72 having a clutch hub 74 journalled on input shaft 60, a first clutch plate 76 fixed for rotation with input shaft 60 and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78 and a shift collar 84 splined for rotation with and axial sliding movement on clutch hub 74. As will be detailed, shift collar 84 is arranged to selectively drive an input member of interaxle differential 44.

Shift collar 84 is shown in its central neutral (N) position where it is disengaged from both first clutch plate 76 and second clutch plate 78. With shift collar 84 in its N position, transfer case 20 is in a Neutral non-driven mode with input shaft 60 uncoupled from driven connection with the input of interaxle differential 44, whereby no drive torque is transmitted to either of the output shafts. Shift collar 84 is moveable from its N position to a high-range (H) position whereat shift collar 84 is coupled to first clutch plate 76 and is driven at a direct speed ratio relative to input shaft 60. Accordingly, location of shift collar 84 in its H position functions to establish a high-range drive connection between input shaft 60 and the input to interaxle differential 44. In contrast, shift collar 84 can be moved from its N position to a low-range (L) position whereat shift collar 84 is coupled to second clutch plate 78 and is driven by planet carrier 70 at a reduced speed ratio relative to input shaft 60. Such movement of shift collar 84 to its L position functions to establish a low-range drive connection between input shaft 60 and the input to interaxle differential 44. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

It is contemplated that transfer case 20 could be equipped without synchronizers 80 and 82 if a non-synchronized range shift system is desired. Likewise, the planetary gearset and range shift arrangement shown are tended to merely be representative of one type of two-speed range unit available for use in transfer cases. To this end, any two-speed reduction unit having a shift member moveable to establish first and second ratio drive connections is considered to be within the scope of this invention.

Interaxle differential 44 includes an input member driven by shift collar 84, a first output member driving rear output shaft 40, and a second output member operably arranged to drive front output shaft 30. In particular, interaxle differential 44 includes an annulus gear 90 fixed for rotation and axial sliding movement with shift collar 84, a sun gear 92 fixed to a quill shaft 94 that is rotatably supported on rear output shaft 40 and a pinion carrier assembly 96 fixed (i.e., splined) to rear output shaft 40. Pinion carrier assembly 96 includes a first carrier ring 96A fixed (i.e., splined) for rotation with rear output shaft 40, a second carrier ring 96B and pins rotatably supporting meshed pairs of first pinion gears 98 and second pinion gears 100 (see FIG. 2) therebetween. In addition, first pinion gears 98 are meshed with annulus gear 90 while second pinion gears 100 are meshed with sun gear 92. As such, driven rotation of annulus gear 90 (at either of the direct or reduced speed ratios) causes drive torque to be transmitted to rear output shaft 40 via pinion carrier assembly 96 and to quill shaft 94 via sun gear 92. Drive torque is transferred from quill shaft 94 to front output shaft 30 through a transfer assembly which includes a drive sprocket 102 fixed to quill shaft 94, a driven sprocket 104 fixed to front output shaft 30 and a drive chain 106 meshed with sprockets 102 and 104. Based on the particular configuration and sizing of the gears associated with interaxle differential 44, a specific torque distribution ratio is established (i.e., 50/50, 64/36) between rear output shaft 40 and front output shaft 30.

Figure 4:
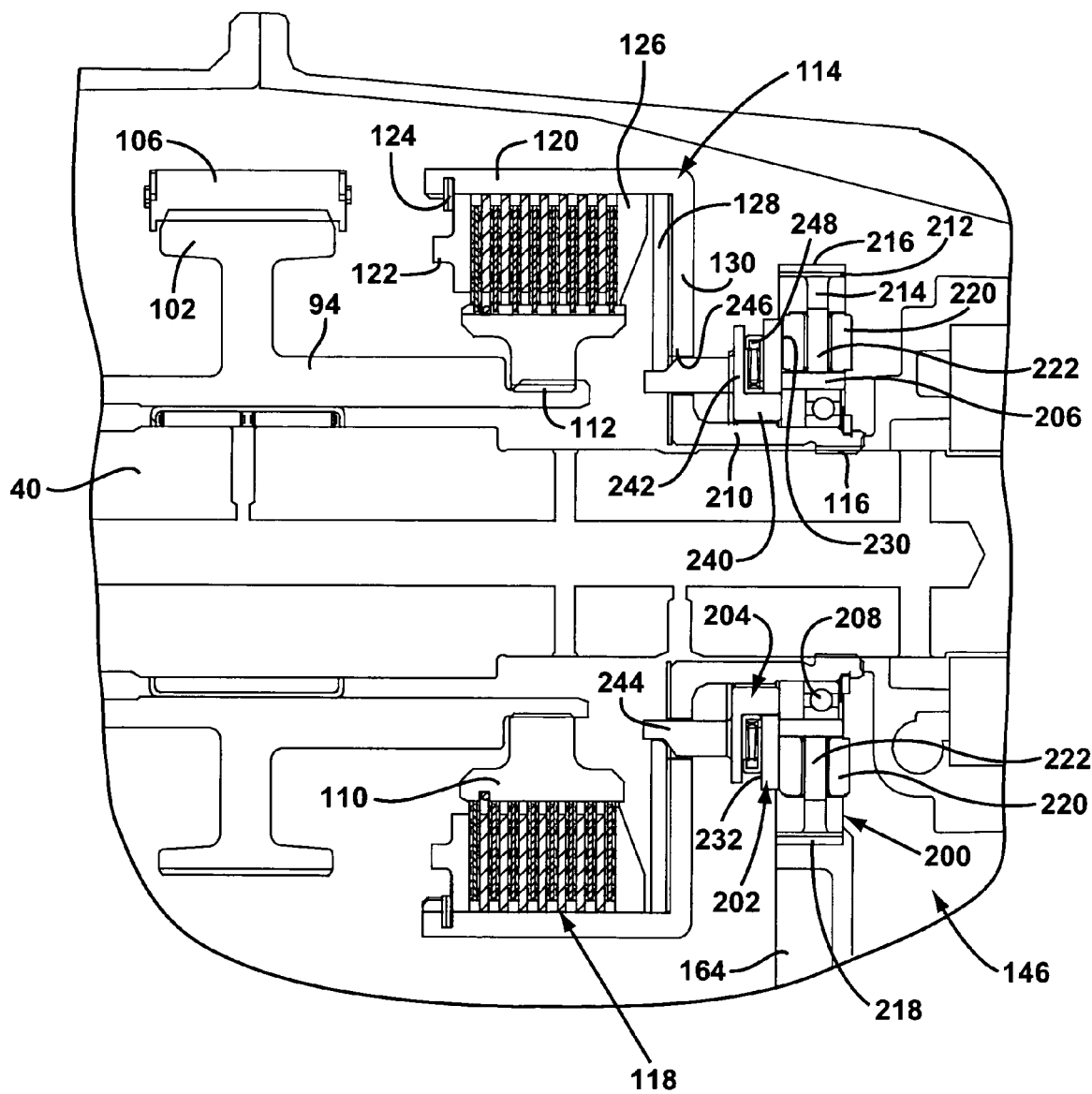

Referring primarily to FIG. 4, mode clutch assembly 46 is shown to include a clutch hub 110 fixed via a spline connection 112 to a tubular end segment of quill shaft 94, a clutch drum 114 fixed via a spline connection 116 to rear output shaft 40 and a multi-plate clutch pack 118 operably disposed between hub 110 and drum 114. Clutch pack 118 includes a set of outer clutch plates that are splined for rotation with and axial movement on an outer cylindrical rim segment 120 of drum 114. Clutch pack 118 also includes a set of inner clutch plates that are splined for rotation with and axial movement on clutch hub 110. Clutch assembly 46 further includes a reaction plate 122 that is splined for rotation with outer rim segment 120 of drum 114 and retained thereon via a lock ring 124, and a pressure plate 126 that is also splined for rotation with outer rim segment 120 of drum 114. Pressure plate 126 is adapted to move axially for exerting a compressive clutch engagement force on clutch pack 118 in response to resilient pivotal movement of disk levers 128. Disk levers 128 are shown to be located between pressure plate 126 and a radial plate segment 130 of drum 114.

Pressure plate 126 is axially moveable relative to clutch pack 118 between a first or "released" position and a second or "locked" position. With pressure plate 126 in its released position, a minimum clutch engagement force is exerted on clutch pack 118 such that virtually no drive torque is transferred through clutch assembly 46 so as to establish a differentiated or full-time four-wheel drive mode. In contrast, location of pressure plate 126 in its locked position causes a maximum clutch engagement force to be applied to clutch pack 118 such that front output shaft 30 is, in effect, coupled for common rotation with rear output shaft 40 so as to establish a non-differentiated or locked four-wheel drive mode. Therefore, accurate control of the position of pressure plate 126 between its released and locked position permits adaptive regulation of the torque biasing between rear output shaft 40 and front output shaft 30, thereby establishing an adaptive all-wheel drive mode.

Power-operated actuation mechanism 48 is operable to coordinate movement of shift collar 84 between its three distinct range positions with movement of pressure plate 126 between its released and locked positions. In its most basic form, actuation mechanism 48 includes an electric motor assembly 58, a reduction geartrain 140 driven by motor assembly 58, a range actuator assembly 144 and a mode actuator assembly 146.

Reduction geartrain 140 includes a bevel gearset 150 and a spur gearset 152. Bevel gearset 150 includes a drive pinion 154 that is driven by an output shaft of electric motor assembly 58 and meshed with a bevel gear 156 to provide a first reduction ratio. Bevel gear 156 is rotatably supported by a bearing assembly 160 from housing 66 for rotation about a first rotary axis. The first reduction ratio established by bevel gearset 150 is preferably in the range of 3:1 to 10:1 and, more preferably, is about 6:1. Spur gearset 152 includes a first gear 162 rigidly secured to bevel gear 156 for common rotation about the first rotary axis and which is meshed with a second gear 164 to provide a second reduction ratio. Second gear 164 is rotatably supported from housing 66 by a bearing assembly 166 for rotation about a second rotary axis. Preferably, the second reduction ratio provided by spur gearset 152 is similar in range to that of bevel gearset 150 with a preferred ratio of about 6:1. The cumulative reduction of about 36:1 between the output shaft of electric motor assembly 58 and second gear 164 permits the use of a small, low power electric motor.

Figure 5:
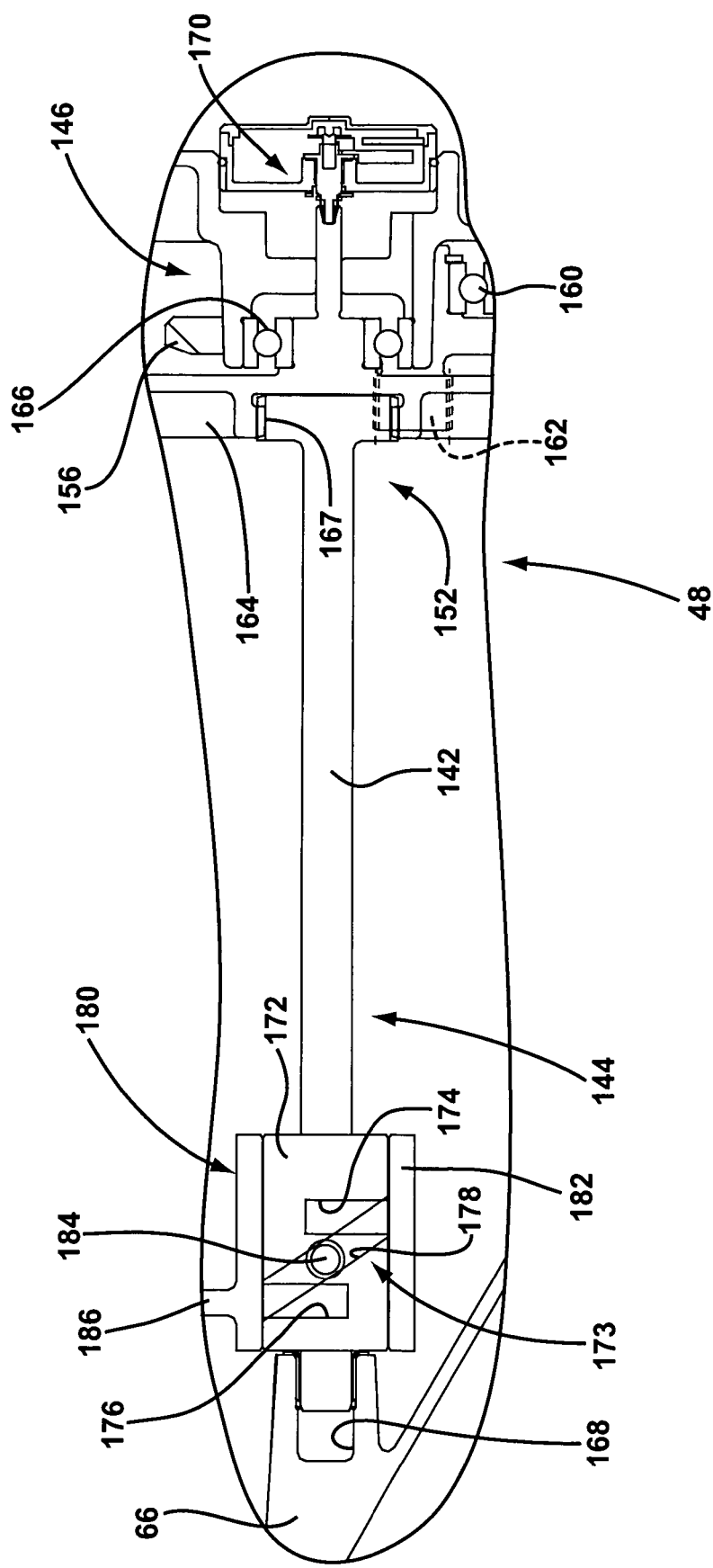

Referring primarily to FIG. 5, range actuator assembly 144 is shown to include a driveshaft 142 and a range cam 172 that is fixed for rotation with driveshaft 142. As seen, driveshaft 142 has a first end fixed via a spline connection 167 for common rotation with second gear 164 and a second end that is rotatably supported in a socket 168 formed in housing 66. In addition, an angular position sensor, such as an encoder unit 170, is provided for accurately detecting the rotated position of second gear 164. Range cam 172 is cylindrical and includes a circumferential groove 173 comprised of a high-range dwell segment 174, a low-range dwell segment 176, and a helical intermediate shift segment 178 interconnecting dwell segments 174 and 176. Range actuator assembly 144 further includes a range fork 180 having a tubular sleeve 182 surrounding range cam 172, a follower pin 184 which extends from range fork sleeve 182 into groove 173 and a fork segment 186 extending from sleeve 182 into an annular groove 190 formed in shift collar 84.

Rotation of range cam 172 results in axial movement of shift collar 84 due to the movement of follower pin 184 within shift segment 178 of groove 173. Specifically, when it is desired to shift range unit 42 into its high-range drive mode, electric motor 58 is energized to cause rotation of second gear 164 and driveshaft 142 in a first direction which, in turn, causes concurrent rotation of range cam 172. Such rotation of range cam 172 causes follower pin 184 to move within intermediate shift segment 178 of groove 173 until shift collar 84 is located in its H position. With shift collar 84 in its H position, the high-range drive connection is established between input shaft 60 and annulus gear 90. Continued rotation of second gear 164 and driveshaft 142 in the first direction causes follower pin 184 to exit shift segment 178 and enter high-range dwell segment 174 for maintaining shift collar 84 in its H position. Thereafter, concurrent rotation of second gear 164, driveshaft 142 and range cam 172 in the opposite or second direction causes follower pin 184 to exit high-range dwell segment 174 and re-enter helical shift segment 178 for causing shift collar 84 to begin moving from its H position toward its L position. Upon continued rotation of range cam 172 in the second direction, follower pin 184 exits shift segment 178 and enters low-range dwell segment 176 of groove 173 for locating shift collar 84 in its L position and establishing the low-range drive connection between planet carrier 70 and annulus gear 90.

As best seen from FIGS. 2 and 4, mode actuator assembly 146 includes a drive member 200, a cam member 202 and a thrust member 204. Drive member, hereinafter referred to as control gear 200, has a cylindrical inner rim segment 206 rotatably supported by a bearing assembly 208 on an inner sleeve segment 210 of clutch drum 114, an outer rim segment 212 and a web segment 214 therebetween. Outer rim segment 212 is shown to have external gear teeth 216 extending entirely around its outer circumference that are meshed with gear teeth 218 on second gear 164. Control gear 200 further includes a pair of diametrically opposed rollers 220 that are retained in rolling channels formed in web segment 214. Rollers 220 are shown to be mounted for rotation on retainer pins 222 which are secured to web segment 206. According to a preferred construction, the size and number of teeth 218 on second gear 164 are identical to the size and number of teeth 216 on control gear 200 to provide a direct (i.e., 1:1) ratio therebetween.

Cam member 202 is a ring-like structure having an aperture surrounding inner sleeve segment 210 of drum 114 and an outwardly extending anti-rotation lug 224. As best seen from FIG. 6A through 6G, lug 224 is retained between a pair of diametrically opposed anti-rotation shoulder stops 226A and 226B formed in housing 66 so as to permit rotation of cam member 202 through a range of angular travel delimited by anti-rotation stops 226A and 226B. In the arrangement shown, the range of rotary movement for cam member 202 is about 180°. Cam member 202 defines a first face surface 230 and a second face surface 232. First face surface 230 has four sequential ramp surfaces 234A through 234D, and each roller 220 on control gear 200 is maintained in rolling contact with one of these four sequential ramp surfaces. In fact, the ramp surfaces define 90° quadrants with one opposing pair 234A and 234C operable for controlling axial movement of cam member 202 between retracted and extended positions relative to control gear 200 when shift collar 84 is located in its H position. Likewise, the second opposing pair 234B and 234D of ramp surfaces control axial movement of cam member 202 between retracted and extended positions when shift collar 84 is located in its L position. The taper profile of each sequential ramp surface is mirror-image, as shown in FIG. 7, to cause axial movement of cam member 202 between its retracted and extended positions when cam member 202 is prevented from rotating due to engagement of lug 224 with one of anti-rotation stops 226A and 226B.

Thrust member 204 includes a hub segment 240 surrounding inner sleeve segment 210 of drum 114, a plate segment 242 extending radially from hub segment 240, and a plurality of circumferentially-spaced thrust pins 244 that extend axially from plate segment 242. Each thrust pin 244 has a terminal end which extends through a bore 246 formed in plate segment 130 of drum 114 and which is adapted to engage the free end of disk levers 128. A thrust bearing assembly 248 is provided between second face surface 232 of cam plate 202 and plate segment 242 of thrust member 204.

The biasing force exerted by disk levers 128 on thrust member 204 acts to maintain constant engagement of control gear rollers 220 with the ramp surfaces on cam member 202. Accordingly, when cam member 202 is axially located in its retracted position, disk levers 128 are released from engagement with pressure plate 126, whereby pressure plate 126 is located in its released position and clutch assembly 46 is considered to be in a released or non-engaged state. In contrast, axial movement of cam member 202 from its retracted position toward its extended position causes thrust pins 244 to deflect disk levers 128 which, in turn, causes pressure plate 126 to move axially from its released position toward its locked position. As noted, such movement of pressure plate 126 causes a compressive clutch engagement force to be applied to clutch pack 118 for transferring torque through clutch assembly 46. Since control gear 200 is restrained from moving axially, rotation of control gear 200 relative to cam member 202 causes rollers 220 to ride along the ramp surface on cam member 202 which results in axial movement of cam member 202.

As noted, power-operated actuation mechanism 48 coordinates axial movement of shift collar 84 with axial movement of cam member 202 to establish a plurality of different four-wheel drive modes. The available drive modes include a full-time four-wheel high-range (4WH) drive mode, an adaptive all-wheel high-range (AWH) drive mode, a locked four-wheel high-range (LOCK-4WH) drive mode, a Neutral mode, a full-time four-wheel low-range (4WL) drive mode, an adaptive all-wheel low-range (AWL) drive mode and a locked four-wheel low-range (LOCK-4WL) drive mode. While it is contemplated that mode select mechanism 54 would most likely limit the available selection to the AWH, LOCK-4WH, N and LOCK-4WL drive modes in a typical vehicle application, the following description of each drive mode is provided.

Figure 6A:
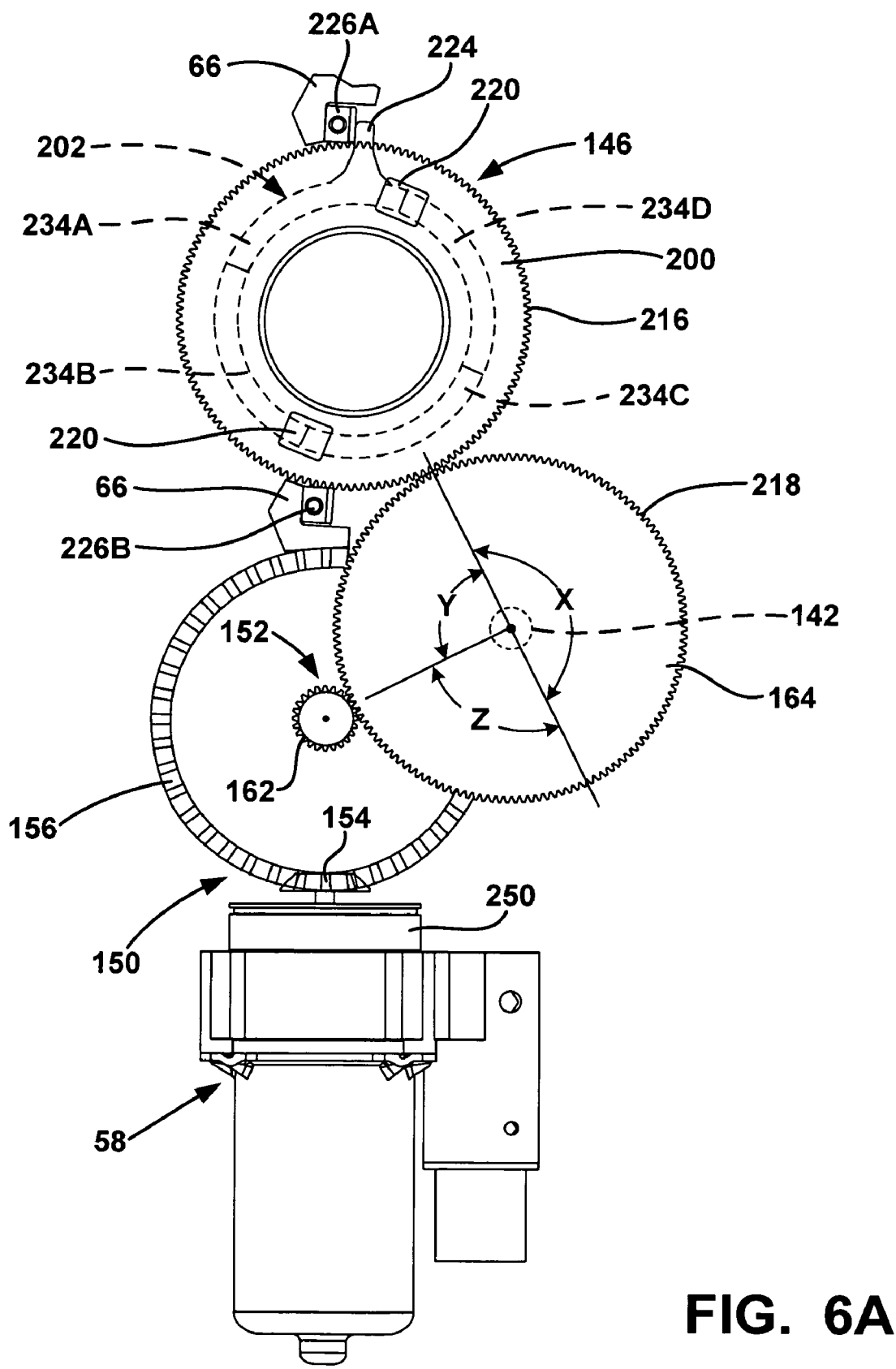
FIGS. 6A through 6G are end views of the components associated with the power-operated actuation mechanism in different positions for establishing the various available drive modes.
Figure 6B:
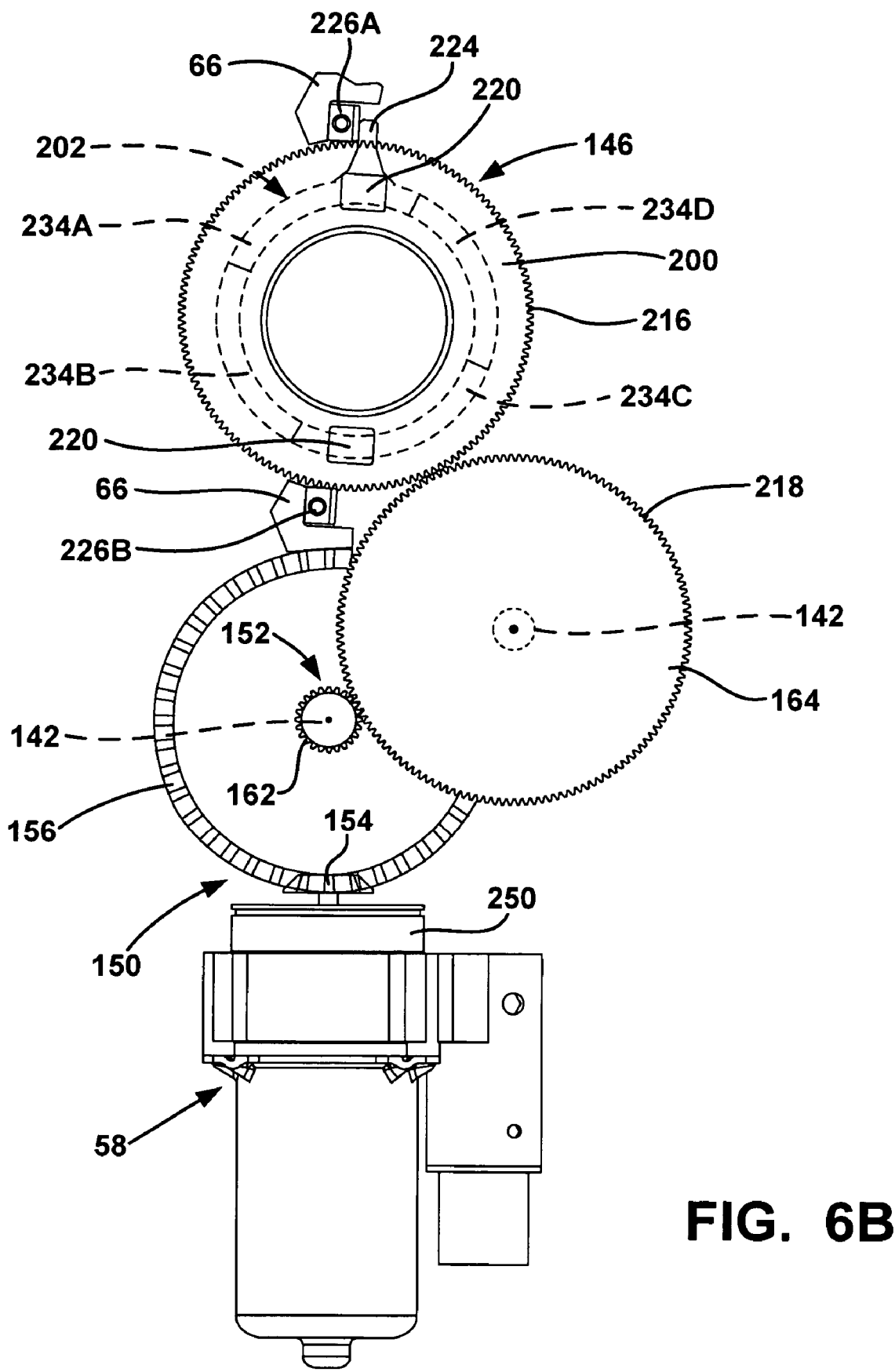

In operation, when mode select mechanism 54 indicates selection of the 4WH drive mode, ECU 56 signals electric motor 58 to rotate geartrain 140 until second gear 164 is located in the position shown in FIG. 6A. Specifically, second gear 164 has been rotated in a first (i.e., clockwise) direction to a position where: A) concurrent rotation of driveshaft 142 has caused shift collar 84 to move to its H position; and B) the resulting rotation of control gear 200 in a first (i.e., counter-clockwise) direction has caused concurrent rotation of cam member 202 until its lug 224 engages anti-rotation stop 226A. In this position, each roller 220 on control gear 200 bear against adjacent ramp surfaces at their complementary low points (see FIG. 7) such that cam member 202 is axially located in its retracted position. As such, pressure plate 126 is located in its released position and clutch assembly 46 is released.

When mode select mechanism 54 thereafter indicates selection of the AWH drive mode, ECU 56 energizes electric motor 58 to cause geartrain 140 to continue rotating second gear 164 in its first direction. As indicated, high-range dwell segment 174 of groove 173 in range cam 172 accommodates the additional rotation of driveshaft 142 resulting from such continued rotation of second gear 164 for maintaining shift collar 84 in its H position. As is evident, continued rotation of second gear 164 in its first direction results in continued rotation of control gear 200 in its first direction. However, such continued rotation of control gear 200 now causes non-rotary axial movement of cam member 202 from its retracted position toward an intermediate or "adapt" position. Specifically, such axial movement of cam member 202 results from tab stop 226A preventing further concurrent rotation of cam member 202 with control gear 200 such that the resultant relative rotation therebetween cause rollers 220 to move to the position shown in FIG. 6B and ride up complimentary ramp surfaces 234A and 234C, thereby causing axial movement of cam member 202 to its adapt position. The adapt position is selected to provide a predetermined low level of torque transfer across mode clutch assembly 46 to take-up clearances in clutch pack 118 in preparation for adaptive control. Thereafter, ECU 56 determines when and how much torque needs to be transmitted across mode clutch assembly 46 to limit excessive interaxle slip between the output shafts based on current tractive conditions and operating characteristics detected by sensors 52.

The limits of adaptive torque control in the AWH drive mode are established by controlling bi-directional rotation of control gear 200 for axially moving cam member 202 between its adapt and extended positions. Axial movement of cam member 202 to its extended position results from further rotation of second gear 164 in its first direction until control gear 200 is located in the position shown in FIG. 6C. Bi-directional rotation of control gear 200 within this range of travel is controlled by ECU 56 controlling energization of electric motor 58 based on a pre-selected torque control strategy. As will be understood, any control strategy known in the art for adaptively controlling actuation of clutch assembly 46 can be used with the present invention.

Figure 6C:
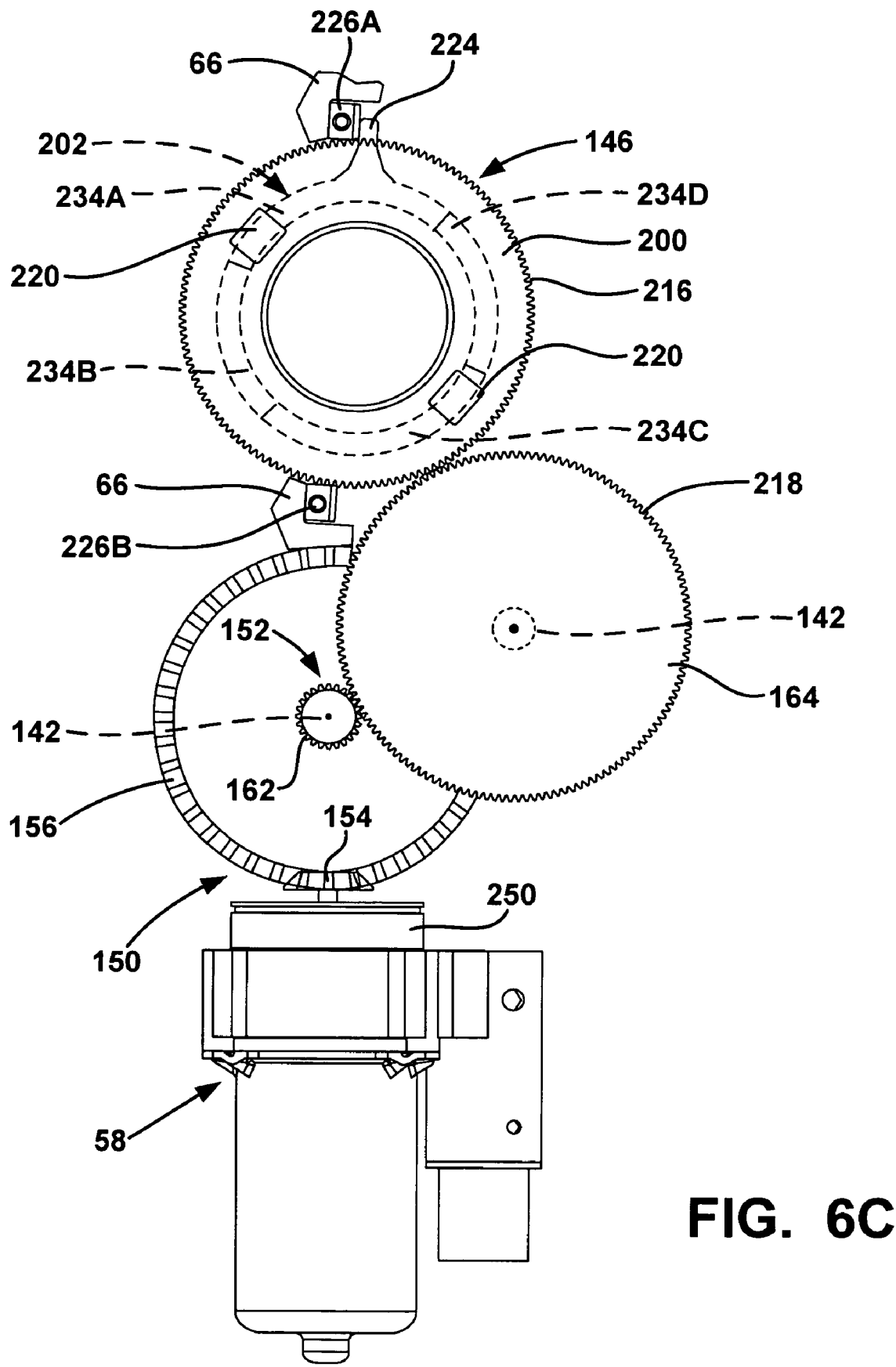
Figure 6D:
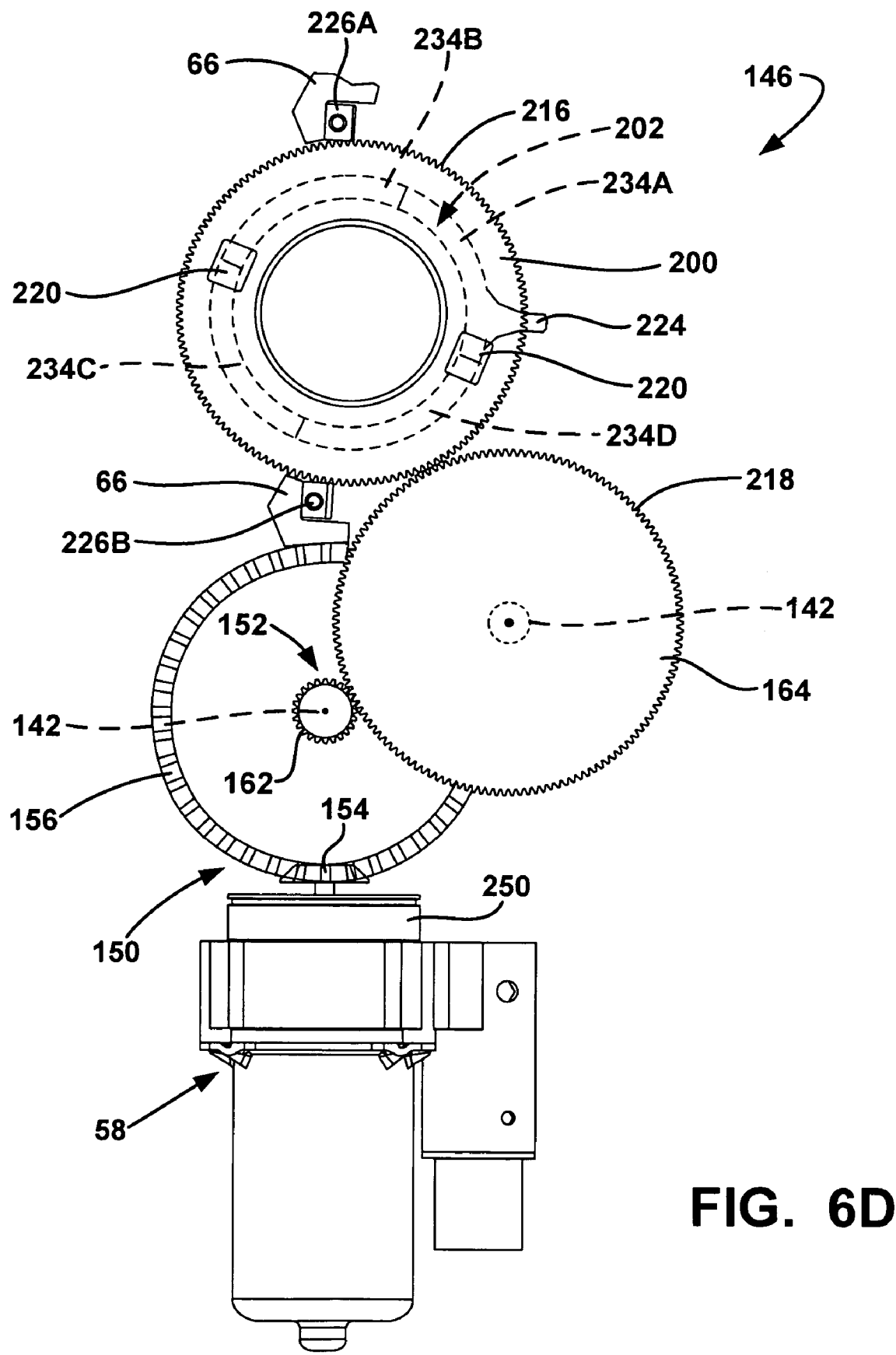

If the vehicle operator selects the LOCK-4WH drive mode, electric motor 58 is energized to rotate second gear 164 and control gear 200 in their respective first directions until control gear 200 is located in the position shown in FIG. 6C. As such, rollers 220 have caused cam member 202 to move to its extended position which, in turn, moves pressure plate 126 to its locked position for fully engaging mode clutch assembly 46. To limit the on-time service requirements of electric motor 58, a power-off brake 250 could be installed to brake rotation of the motor shaft so as to prevent back-driving rotation of geartrain 140 for maintaining pressure plate 126 in its locked position. In this manner, electric motor 58 can be shut-off during operation of transfer case 20 in its LOCK-4WH drive mode. To reiterate, shift collar 84 is maintained in its H position because high-range dwell segment 174 of groove 173 in range cam 172 accommodates the rotation of driveshaft 142 caused by actuation of second gear 164 in its first direction.

If the Neutral mode is selected, second gear 164 is rotated in its second (i.e., counter-clockwise) direction for concurrently rotating driveshaft 142. Such rotation of driveshaft 142 causes follower pin 184 on range fork 180 to ride within shift segment 178 of groove 173 in range cam 172 until shift collar 84 is located in its N position. During such range shifting, mode clutch 46 is maintained in its released state. Specifically, the rotation of second gear 164 in its second direction also causes rotation of control gear 200 in its second (i.e., clockwise) direction from the position shown in FIG. 6A to that shown in FIG. 6D. The continuous engagement of cam member 202 with rollers 220 due to the biasing of disk levers 128 causes cam member 202 to also rotate in its second direction in concert with control gear 200, thereby maintaining cam member 202 in its retracted position. As seen, lug 224 is generally located halfway between stops 226A and 226B when the Neutral mode is established.

Figure 6E:
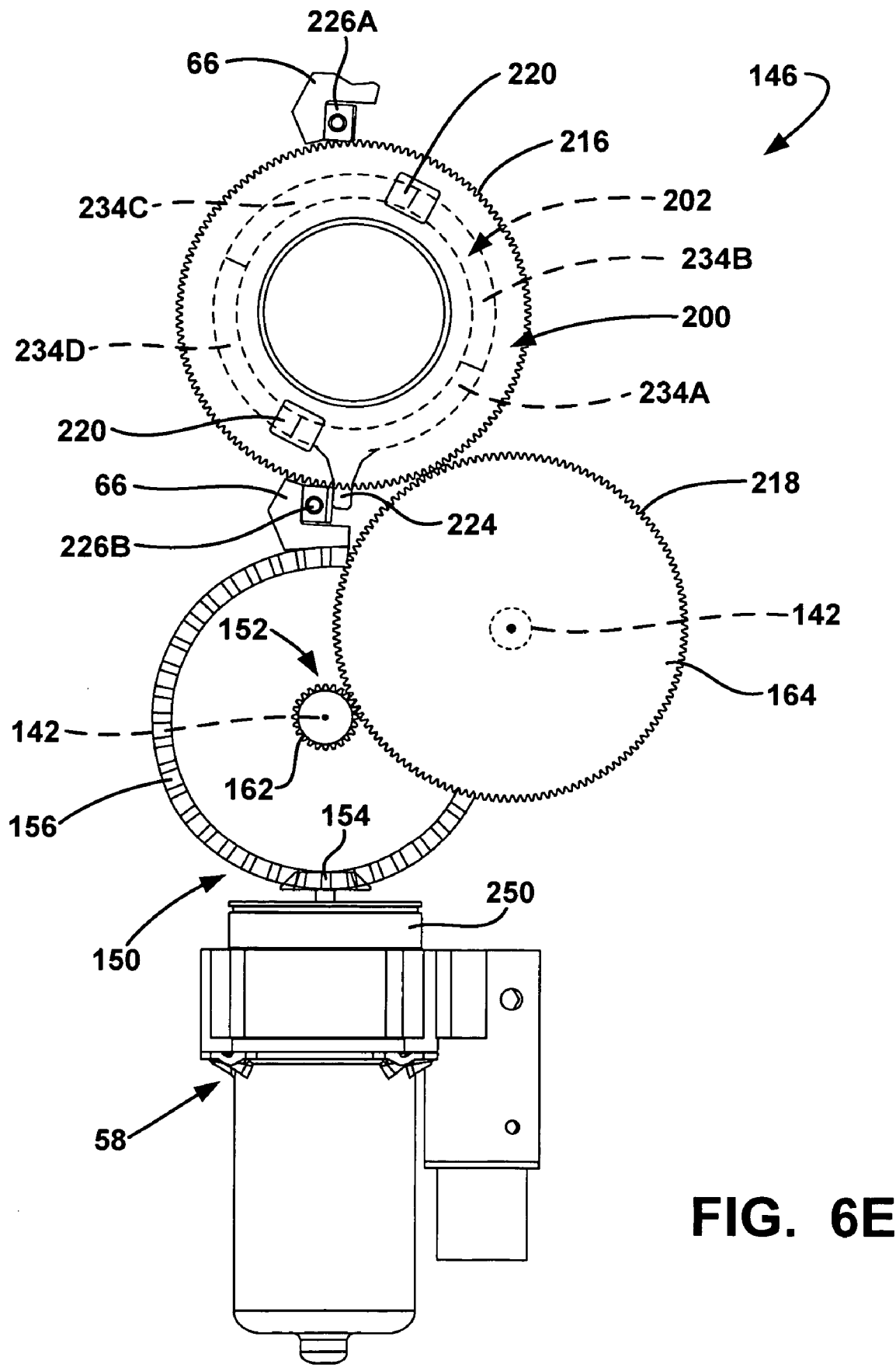
Figure 6F:
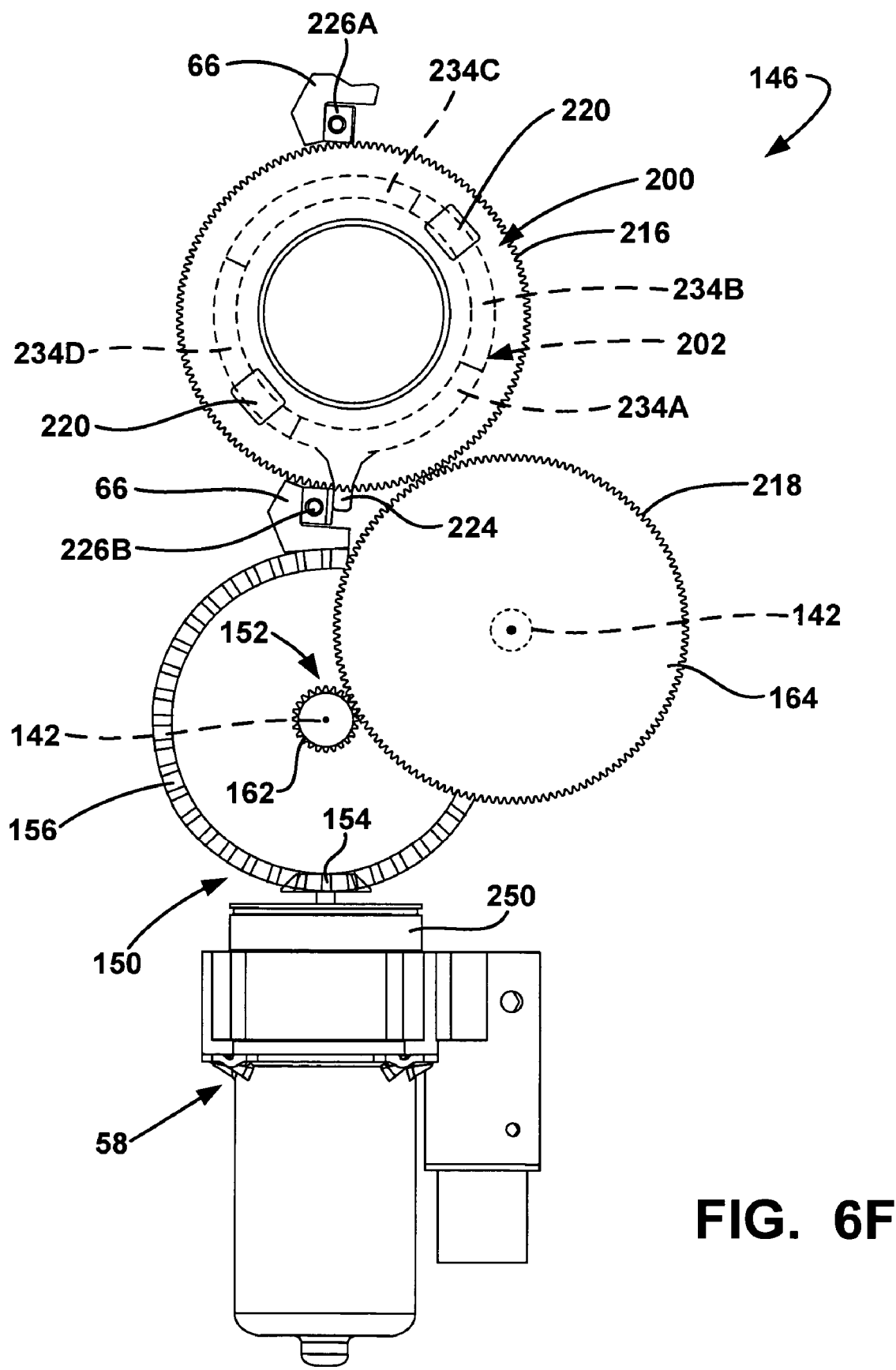

FIG. 6E illustrates the position of the components associated with transfer case 20 for establishing the 4WL drive mode. In particular, second gear 164 has been rotated in its second direction to a position whereat: A) concurrent rotation of driveshaft 142 has caused shift collar 84 to move to its L position; and B) the resulting rotation of control gear 200 in its second position has caused cam member 202 to rotate until its lug 224 now engages anti-rotation stop 226B. In this position, cam member 202 is in its retracted position such that mode clutch assembly 46 is released.

When mode select mechanism 54 indicates selection of the AWL drive mode, ECU 56 energizes motor 58 to cause geartrain 140 to continue rotation of second gear 164 in its second direction. Shift collar 84 is maintained in its L position due to follower pin 184 entering low-range dwell segment 176 of groove 173 in range cam 172 during such continued rotation of driveshaft 142. Furthermore, engagement of lug 224 with stop 226B prevents further rotation of cam member 202 while control gear 200 continues to rotate to the position shown in FIG. 6F. This relative rotation causes cam member 202 to move axially to its adapt position due to rollers 220 engaging ramp surface 234B and 234D. Similar to operation in the AWH drive mode, ECU 56 controls the magnitude of engagement of clutch assembly 46 by controlling the position of control gear 200 between the positions shown in FIGS. 6F and 6G which, in turn, moves cam member 202 between its adapt position and its locked positions. Such adaptive control is again based on a predetermined control strategy utilizing the signals inputted to ECU 56 from sensors 52.

Figure 6G:
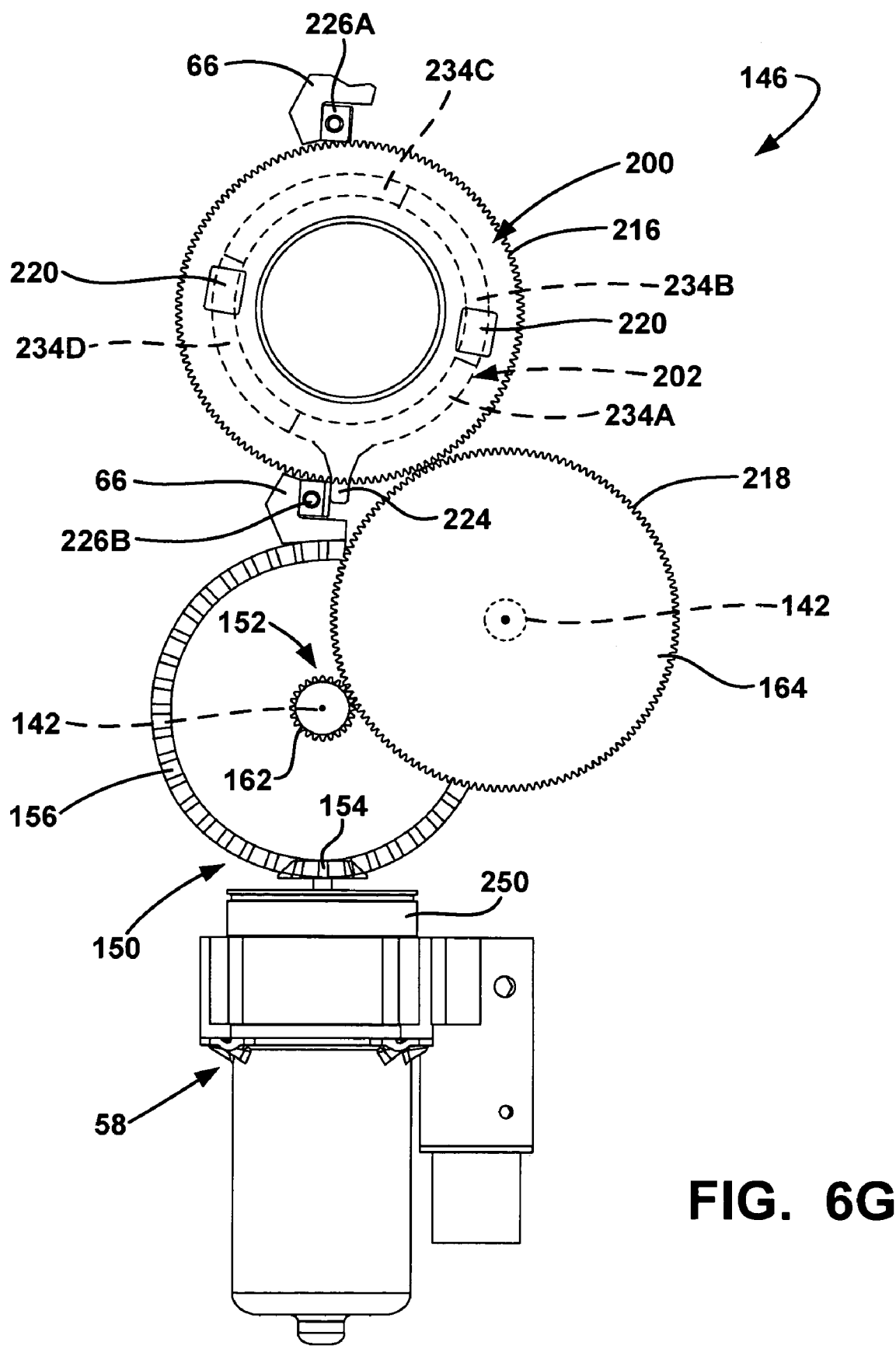

Referring to FIG. 6G, the components are shown for establishing the LOCK-4WL mode with shift collar 84 in its L position and mode clutch assembly 46 fully engaged due to second gear 164 being rotated in its second direction until control gear 200 is located as shown. In this position, cam member 202 is in its extended position for moving pressure plate 126 to its locked position, thereby fully engaging clutch assembly 46. Again, brake 250 would be engaged to prevent rotation of geartrain 140 and hold second gear 164 in the position defining the LOCK-4WL drive mode while permitting electric motor 58 to be de-energized.

According to the present invention, mode actuator assembly 146 and range actuator assembly 144 are interconnected by a common geartrain 140 so as to permit coordinated actuation of both using a single power-operated device, namely electric motor 58. Mode actuator assembly 146 accommodates actuation of range actuator assembly 144 while mode clutch 46 is maintained in a released state for permitting movement of shift collars 84 between its three distinct range positions. Likewise, range actuation assembly 144 accommodates actuation of mode actuator assembly 146 when shift collar 84 is positively located in one of its H and L positions to permit adaptive engagement of clutch assembly 46. To this end, bidirectional rotation of second gear 164 through three distinct ranges of angular travel achieves this coordination feature. Specifically, a first range, identified in FIG. 6A as angle "X", controls movement of shift collar 84 while cam member 202 is maintained in its retracted position. A second angular range, identified as angle "Y" controls engagement of clutch assembly 46 while shift collar 84 is maintained in its H position. Finally, a third range is identified as angle "Z" and controls engagement of clutch assembly 46 when shift collar 84 is maintained in its L position.

While actuation mechanism 48 has been disclosed in association with full-time transfer case 20, it will be understood that interaxle differential 44 could be eliminated such that mode clutch assembly 46 functions to modulate the drive torque transferred from rear output shaft 40 to front output shaft 30 to establish an on-demand four-wheel drive mode. A modified version of transfer case 20 shown in FIG. 2 is now shown in FIG. 8 as transfer case 20A which is operable to define various two-wheel and four-wheel drive modes. Basically, shift collar 84 now includes a drive ring 254 that is splined to a drive ring 256 fixed (i.e., splined) to rear output shaft 40 while clutch assembly 46 is arranged to transfer drive torque from rear output shaft 40 to front output shaft 30. Again, power-operated actuation mechanism 48 is operable to coordinate movement of shift collar 84 and cam member 202 to establish various locked and on-demand four-wheel high-range and low-range drive modes as well as two-wheel drive modes.

Figure 8:
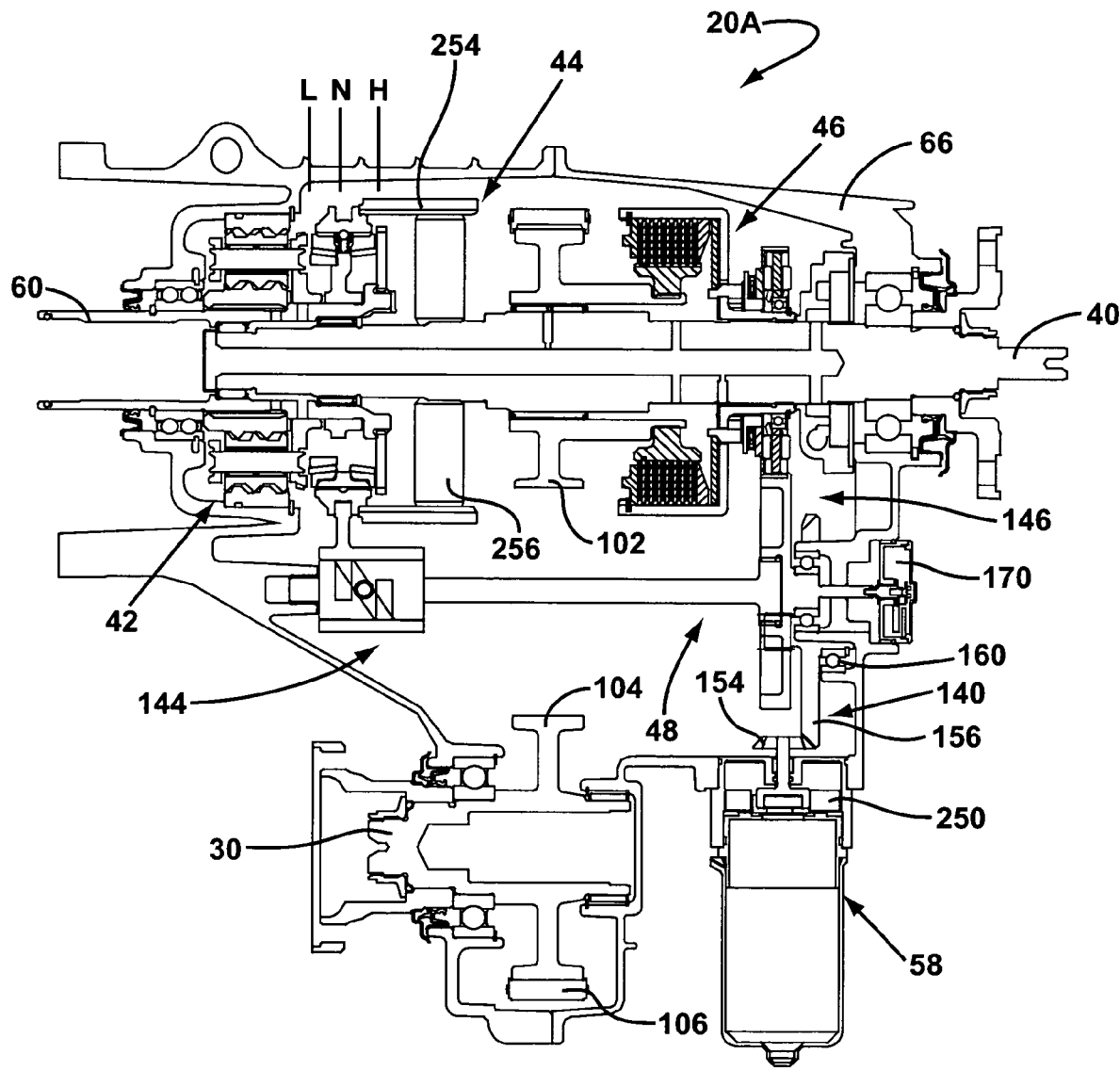
FIG. 8 is a sectional view of a two-speed on-demand transfer case according to an alternative embodiment of the present invention.

When on-demand transfer case 20A of FIG. 8 is used in association with vehicle 10 of FIG. 1, mode select mechanism 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a Neutral mode and a part-time four-wheel low-range (LOCK-4WH) drive mode. Specifically, in the 2WH drive mode, geartrain 140 would be rotated to the position shown in FIG. 6A, whereby shift collar 84 would be located in its H position and clutch assembly 46 would be released such that all drive torque is delivered to rear output shaft 40. In the AUTO-4WH mode, shift collar 84 would be located in its H position and clutch assembly 46 would be continuously modulated based on the value of the sensor signals to vary the torque distribution ratio between rear output shaft 40 and front output shaft 30 in a range between 100:0 and 50:50. This mode is established by controlling rotation of geartrain 40 between the positions shown in FIGS. 6B and 6C. In the LOCK-4WH position, actuation mechanism 48 rotates geartrain 140 to the position shown in FIG. 6C, whereby shift collar 84 would still be located in its H position and clutch assembly 46 would be fully engaged to effectively couple front output shaft 30 to rear output shaft 40. Selection of the Neutral mode causes actuator mechanism 48 to rotate geartrain 140 to the position shown in FIG. 6D, whereby no drive torque is transferred to rear driveshaft 40. When the LOCK-4WL mode is selected, ECU 56 controls actuation mechanism 48 to rotate geartrain 140 to the position shown in FIG. 6G, whereby shift collar 84 is located in its L position while fully engaging clutch assembly 46.

The arrangement described for actuation mechanism 48 is an improvement over the prior art in that the torque amplification provided by reduction gearset 140 combined with the force amplification provided by mode actuator assembly 146 and disk levers 128 permit use of a small low-power electric motor and yet provides extremely quick response and precise control over the position of cam member 202 and thus the magnitude of the clutch engagement force applied to clutch pack 118. In this regard, the present invention is designed to provide a constant mechanical advantage so as to generate a constant torque to force conversion regardless of the rotated position of control gear 200. This feature allows actuation mechanism 48 to be less sensitive to component manufacturing and assembly-related clearances. In addition, fixation of rollers 220 to control gear 200 provides a positive connection so that roller 220 can be driven to any desired position in either direction without reliance on the need to "back drive" upon release. Furthermore, the 360° of angular rotation of control gear 200 improves the resolution characteristics of position sensor 170 for more precise control of the system. Finally, all forces generated are contained by drum 114, thereby permitting the clutch assembly to be packaged into several different driveline configurations without affecting the loads transferred through the main bearings.

Another version of a two-speed on-demand transfer case 20B is shown in FIGS. 9 through 13. Since many of the components of transfer case 20B are generally similar to components previously described with respect to transfer cases 20 and 20A, common reference numerals will be used hereinafter and in the drawings. However, as will be detailed, a power-operated actuation mechanism 250 associated with transfer case 20B is a modified version of the power-operated actuation mechanism 48 shown in association with transfer cases 20 and 20A.

Transfer case 20B is equipped with a two-speed range unit 42, a mode clutch assembly 46 and power-operated actuation mechanism 250 that is operable to control coordinated shifting of range unit 42 and adaptive engagement of mode clutch assembly 46 in response to control signals from ECU 56. As best seen from FIG. 10, range unit 42 includes the two-speed planetary gearset and a non-synchronized dog clutch. In particular, shift collar 84 is splined for rotation with and axially sliding movement on rear output shaft 40. Shift collar 84 is shown in its high-range (H) position whereat its external clutch teeth 252 are meshed with internal clutch teeth 254 formed on sun gear 62 so as to establish the direct speed ratio drive connection between input shaft 60 and rear output shaft 40. As is understood, shift collar 84 can be slid from its high-range position into a low-range (L) position whereat its external clutch teeth 252 mesh with internal clutch teeth 256 formed on a rear carrier ring of planet carrier 70 so as to establish the reduced speed ratio drive connection between input shaft 60 and rear output shaft 40. Shift collar 84 can also be located in a central neutral (N) position whereat its clutch teeth 252 are released from engagement with both sun gear clutch teeth 254 and planet carrier clutch teeth 256.

Figure 11:
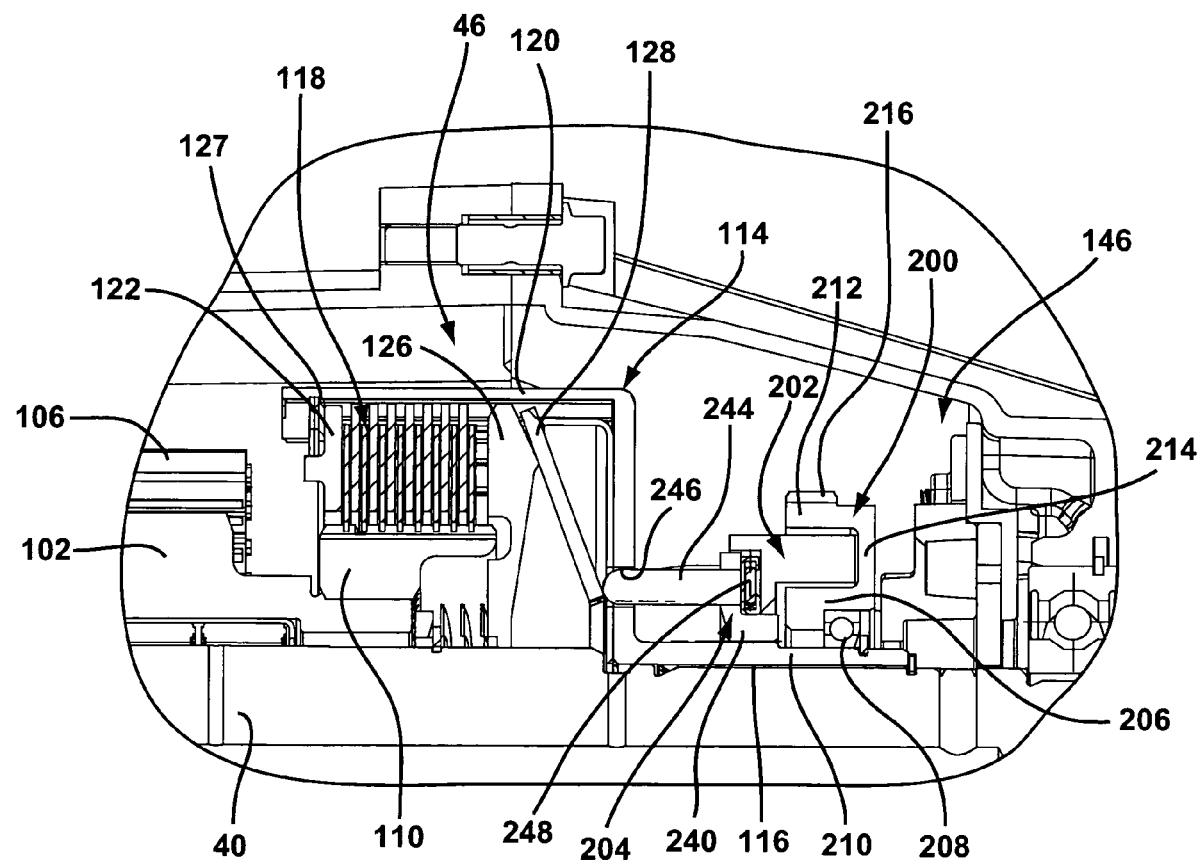

Referring primarily to FIG. 11, mode clutch assembly 46 is again shown to include clutch hub 110 fixed to drive sprocket 102, clutch drum 114 fixed via spline connection 116 to rear output shaft 40 and multi-plate clutch pack 118 disposed between hub 110 and drum 114. As previously disclosed, pressure plate 126 is adapted to move between its released and locked positions relative to clutch pack 118 to vary the drive torque transferred from rear output shaft 40 to front output shaft 30. Such movement of pressure plate 126 is controlled by mode actuator assembly 146. Mode actuator assembly 146 is substantially similar to that shown and described previously in that it includes control gear 200, cam member 202 and thrust member 204. Control gear 200 is rotatably mounted via bearing assembly 208 on sleeve segment 210 of drum 114 and includes a pair of diametrically-opposed rollers 200 (see FIG. 13A) that are adapted to rollingly engage cam surface 234A-234D on first face surface 230 of cam member 200. Control gear 200 also includes gear teeth 216 on its outer peripheral rim segment 212.

As best seen from FIGS. 13A through 13G, cam member 202 includes an anti-rotation lug 224 retained between anti-rotation shoulder stops 226A and 226B formed in housing 66 to permit rotation of cam member 202 through a limited range of angular travel of about 180°. As before, each of rollers 220 on control gear 200 is maintained in rolling contact with one of four cam surfaces 234A-234D, with one opposing pair 234A and 234C operable for controlling axial movement of cam member 202 between its retracted and extended positions relative to control gear 200 when shift collar 84 is located in its H range position. Likewise, the second opposing pair of cam surfaces 234B and 234D control axial movement of cam member 202 between its retracted and extended positions when shift collar 84 is located in its L range position. As described, cam member 202 rotates with control gear 200 during range shifting of shift collar 84 while it is maintained in its retracted axial position relative to clutch pack 118. Cam member 202 is only allowed to move axially toward its extended position when its lug 224 engages one of anti-rotation stops 226A and 226B such that control gear 200 is then permitted to rotate relative to cam member 202. Such axial movement of cam member 202 between its retracted and extended positions results in pressure plate 126 moving axially between its released and locked positions to adaptively regulate the magnitude of the clutch engagement force applied to clutch pack 118.

Power-operated actuation mechanism 250 coordinates axial movement of shift collar 84 between its three distinct range positions with movement of pressure plate 126 between its released and locked positions. Actuation mechanism 250 includes electric motor 260, a reduction gearset 262 driven by motor 260, an actuator shaft 264 driven by gearset 262, a range actuator assembly 266 and mode actuator assembly 26B. Gearset 262 includes a worm shaft 270 driven by an output shaft of motor 260 having worm threads 272 formed thereon that are meshed with worm teeth 274 of a worm gear 276. Worm gear 276 is fixed (i.e., splined) for common rotation with actuator shaft 264. A drive gear 280 is also fixed for common rotation with actuator shaft 264 and is axially restrained via a radial flange 282 formed on actuator shaft 264. Drive gear 280 has gear teeth 282 meshed with gear teeth 216 on control gear 200. Preferably, a 1:1 direct ratio is established between drive gear 280 and control gear 200.

Figure 12:
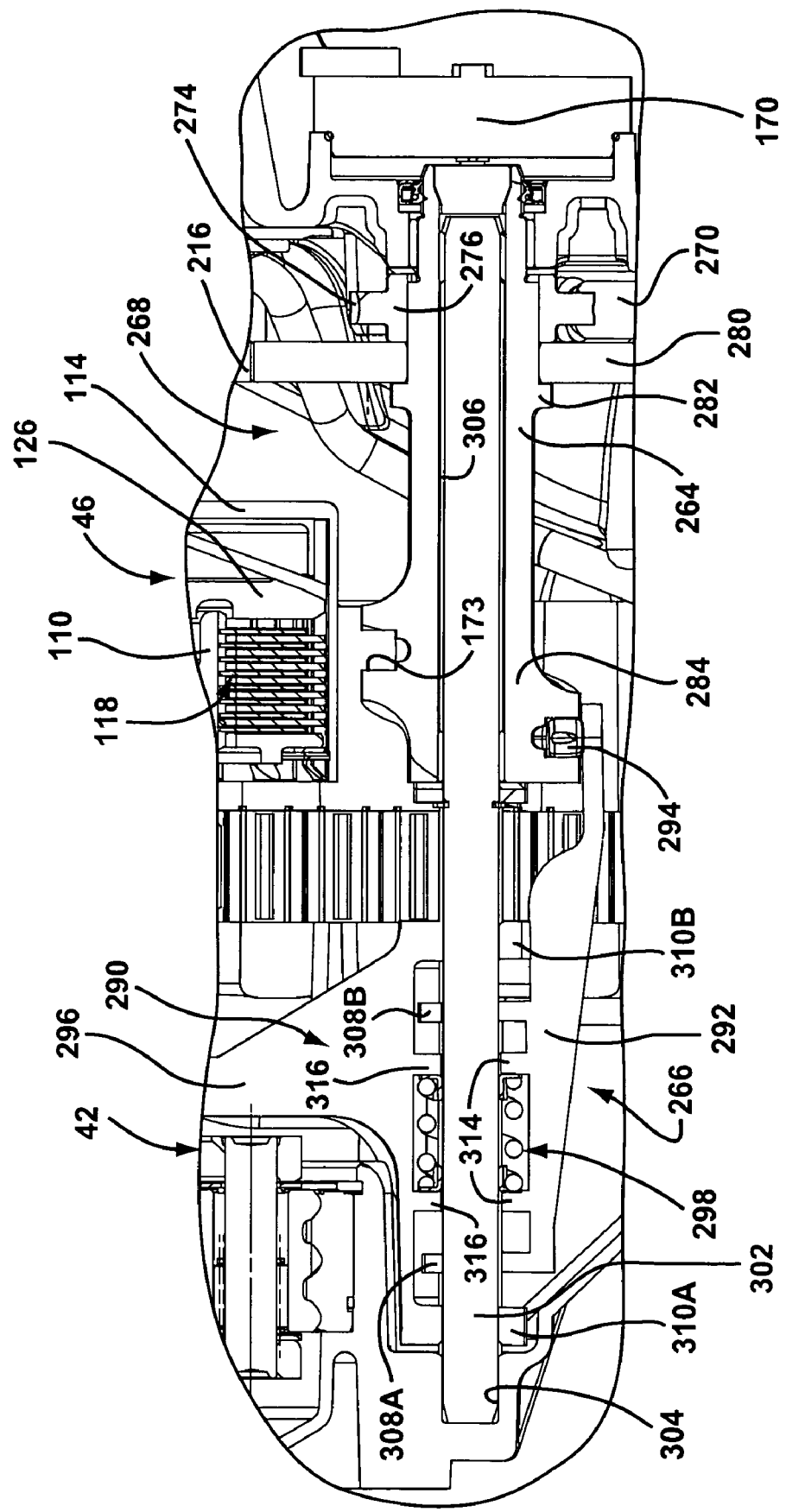
Figure 13A:
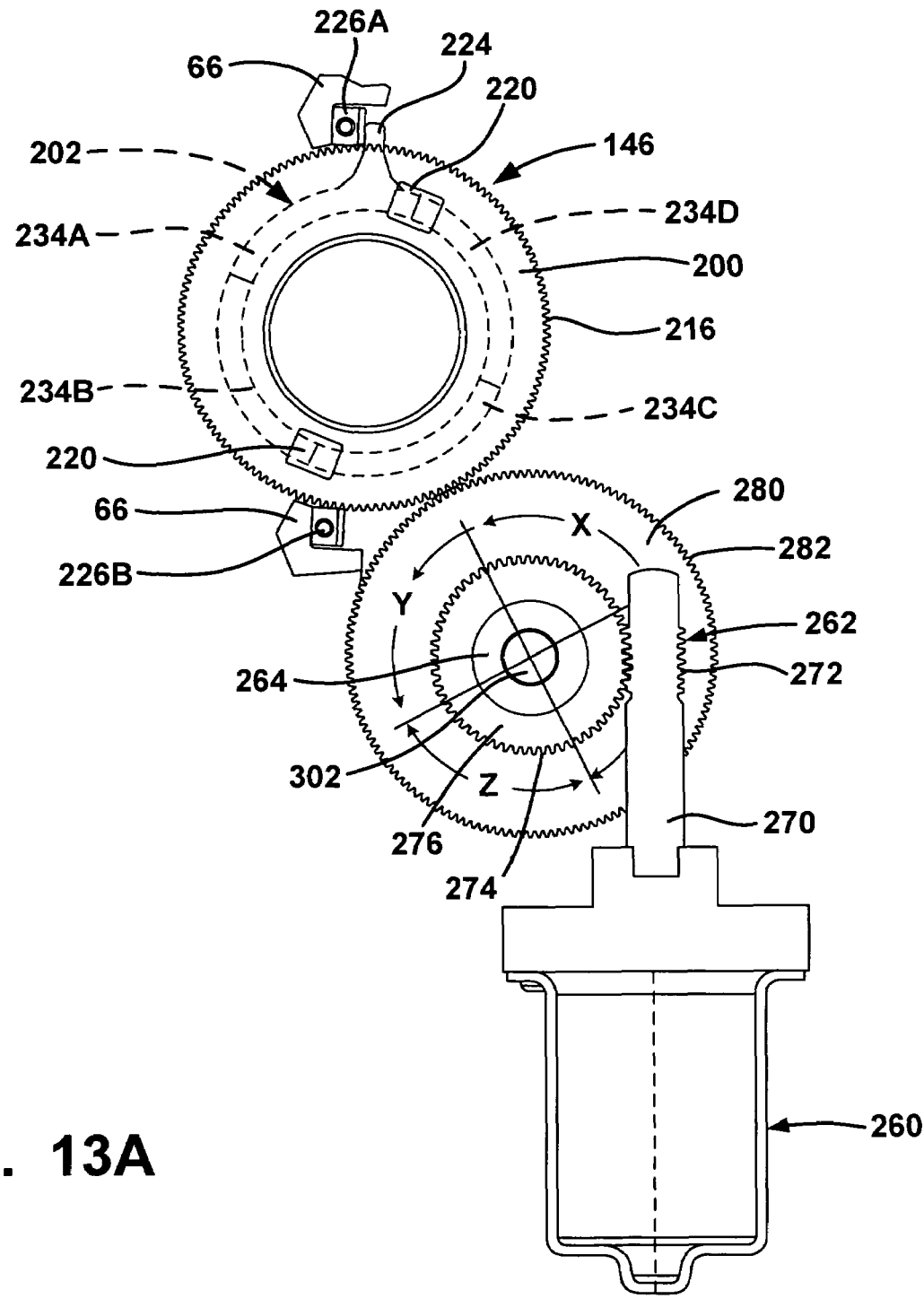
FIG. 13A through 13G are views of the components associated with the power-operated actuator mechanism in different positions for establishing the various available drive modes.
Figure 13B:
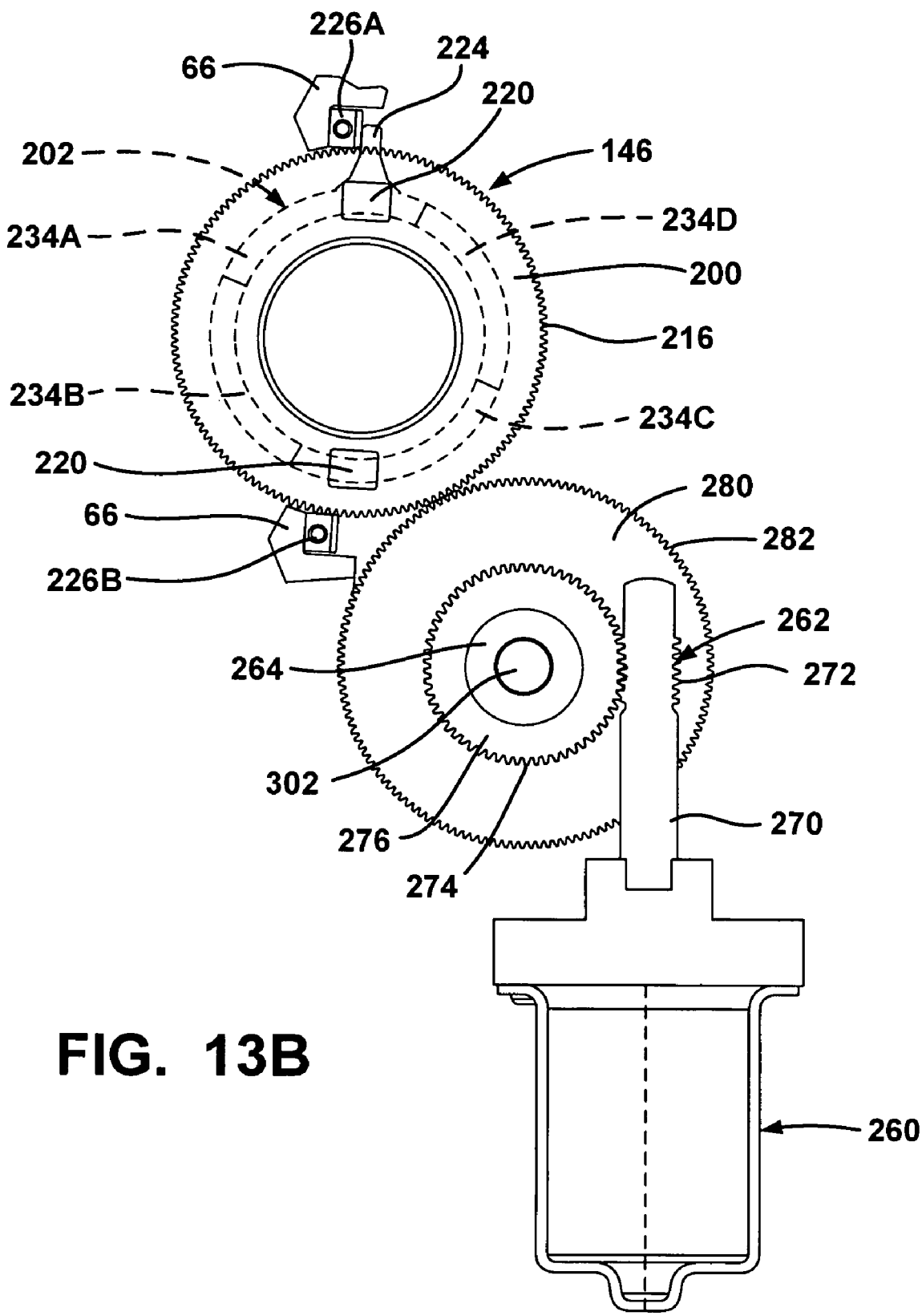
Figure 13C:
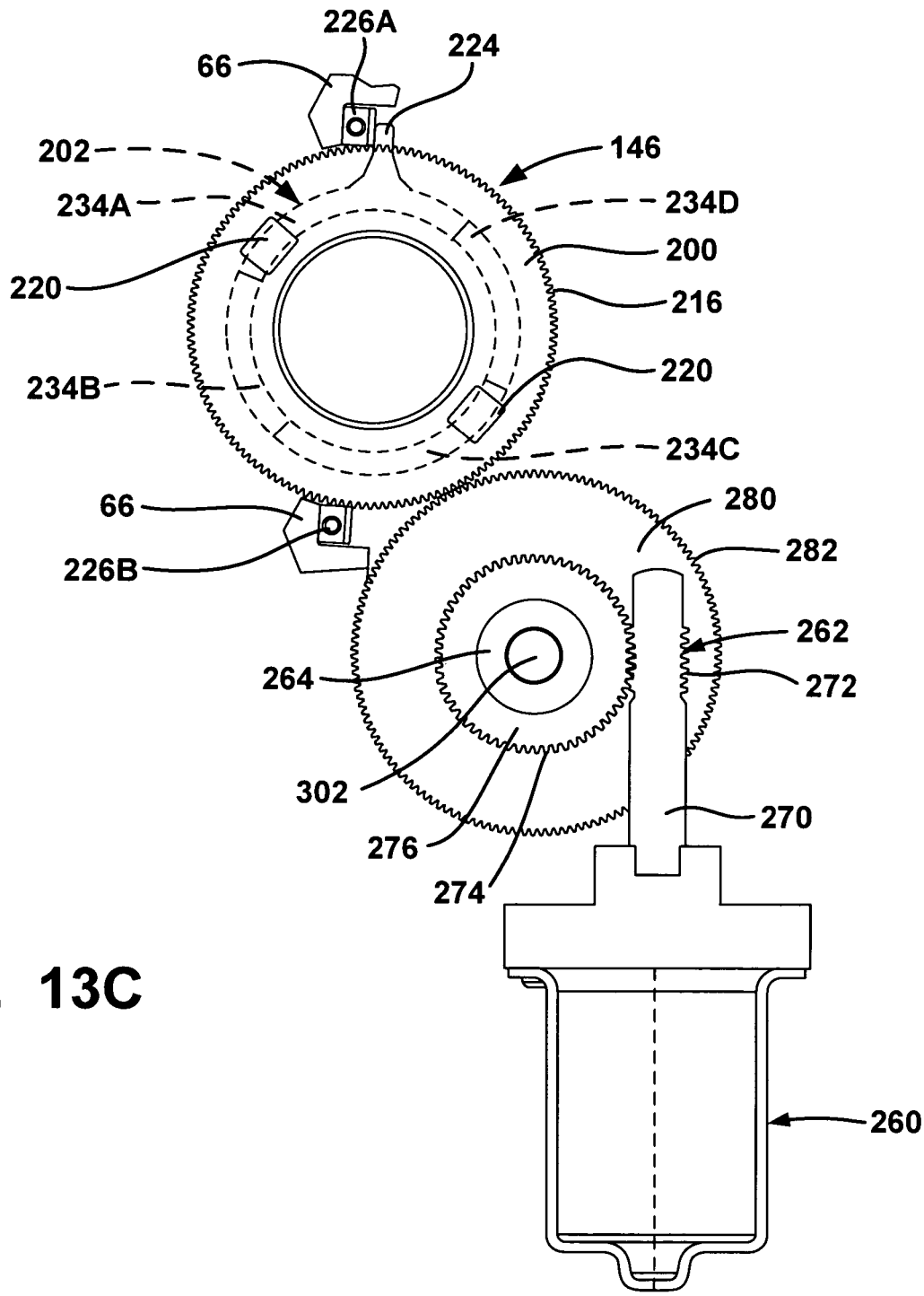
Figure 13D:
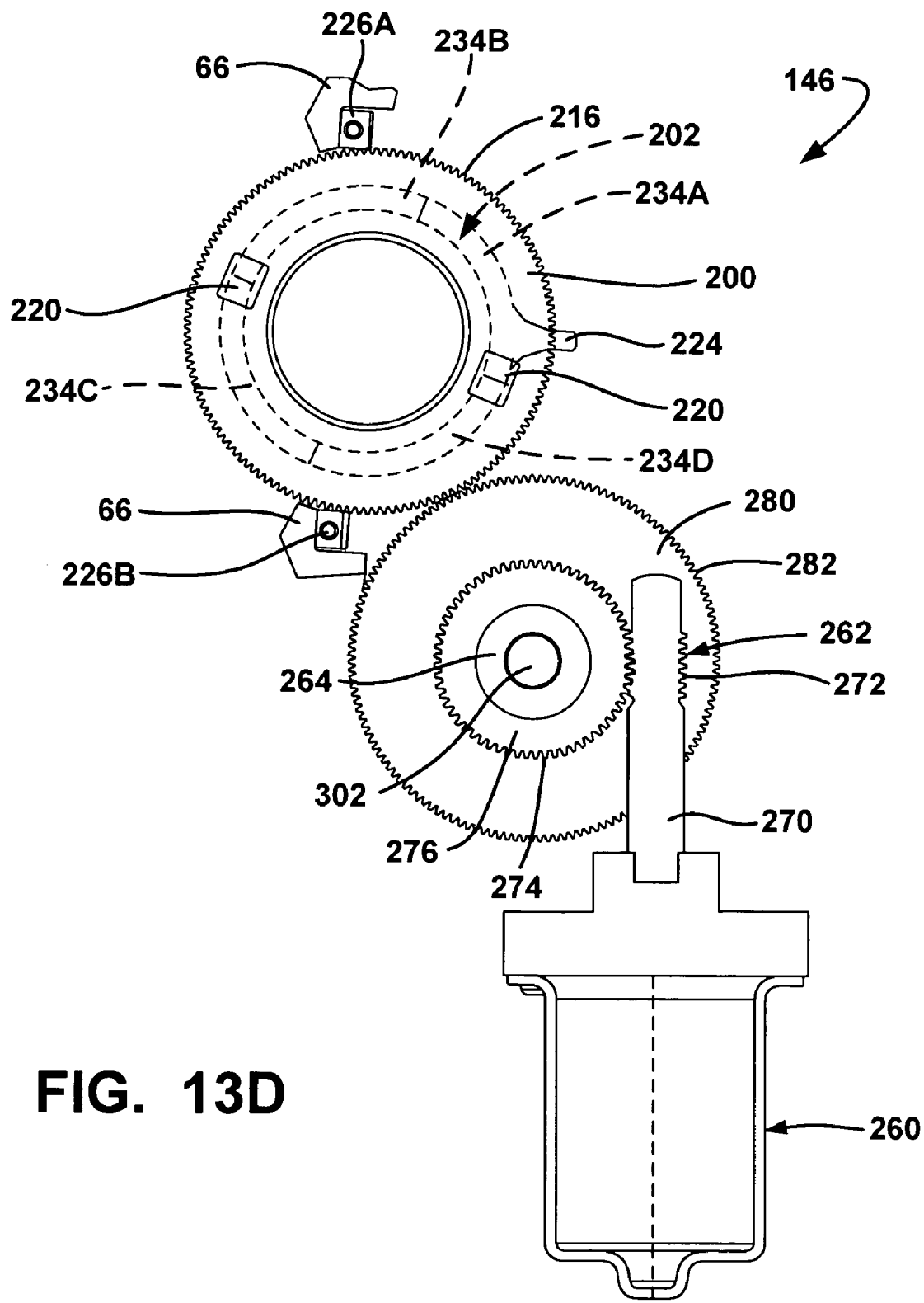
Figure 13E:
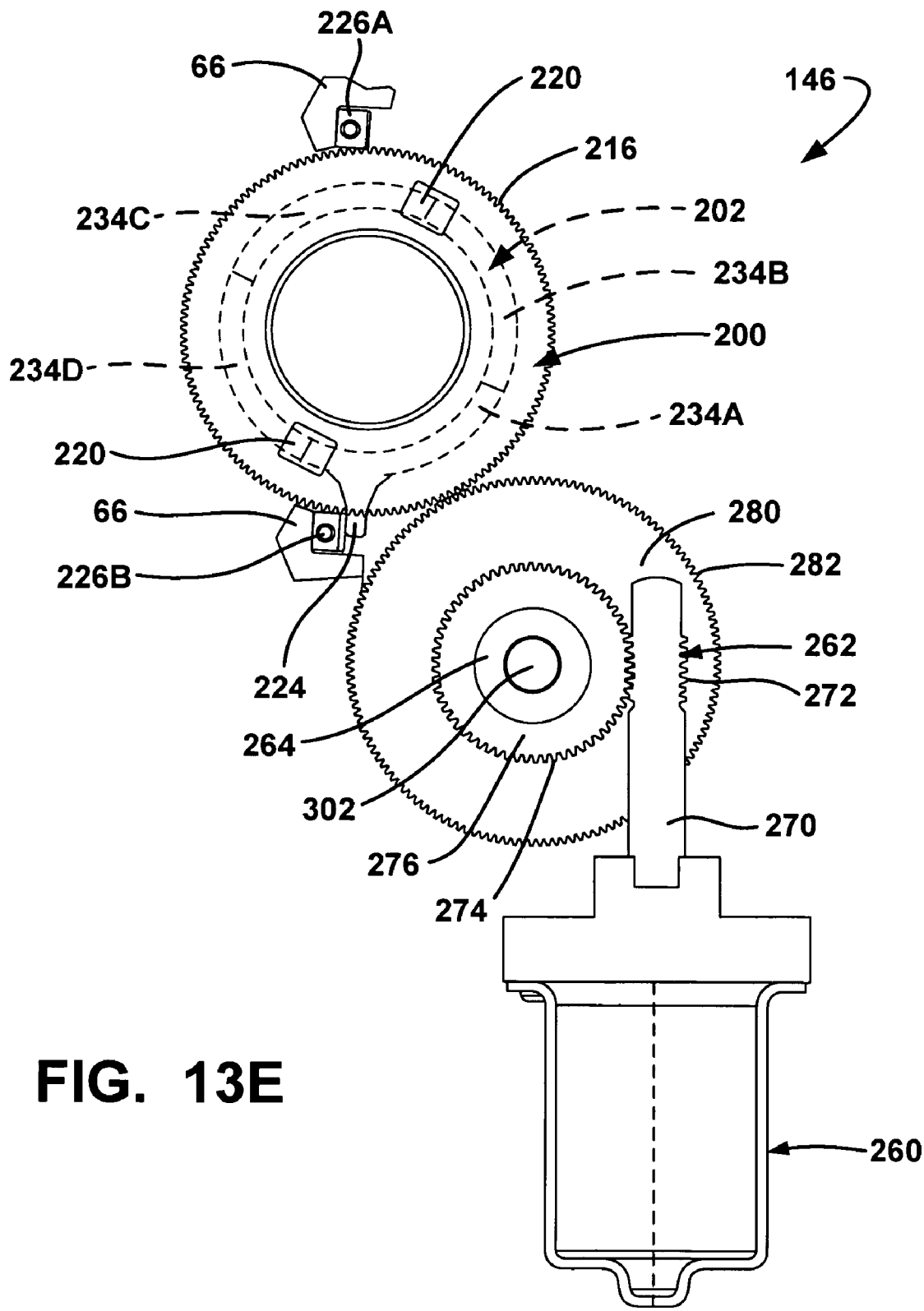
Figure 13F:
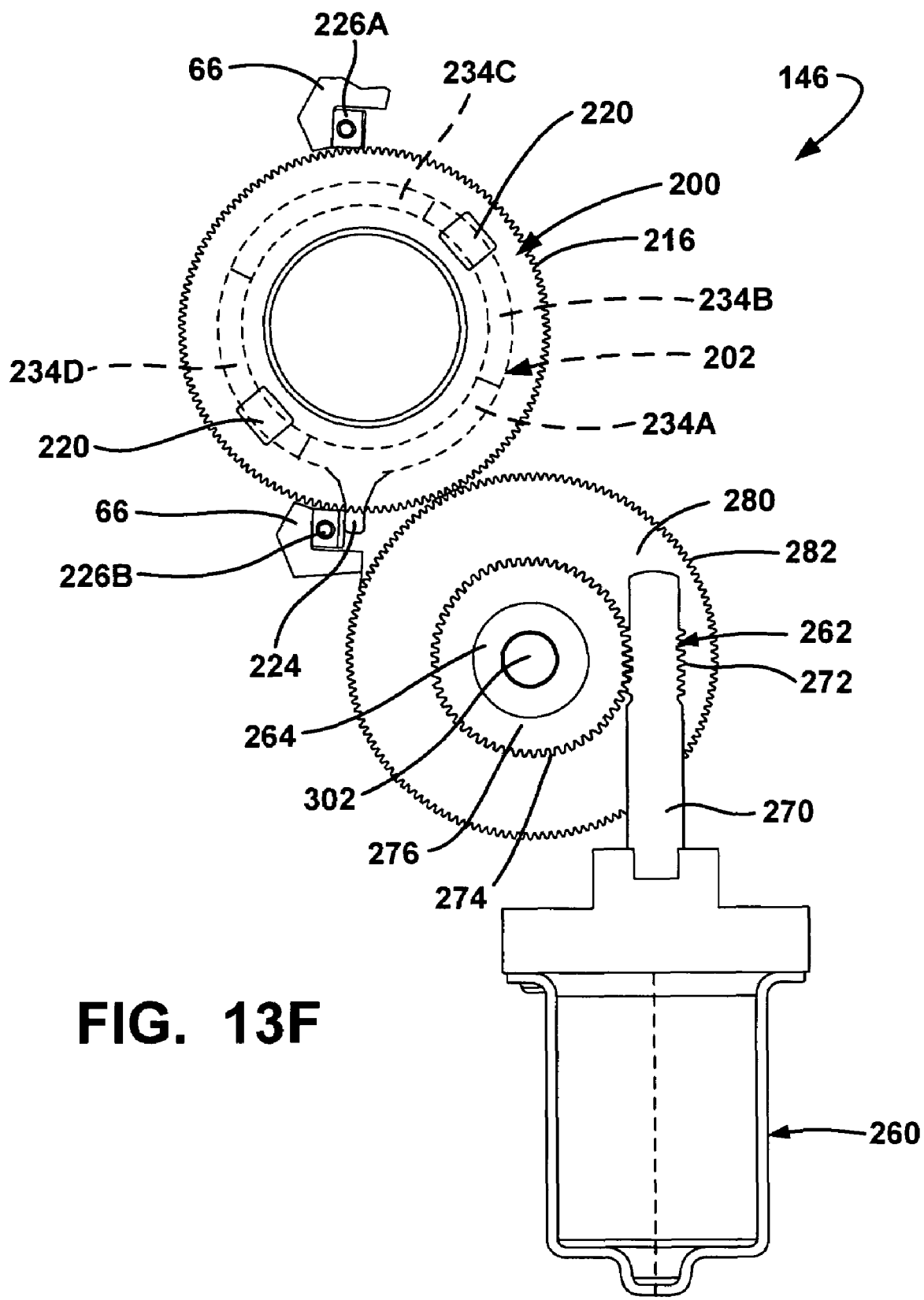
Figure 13G:
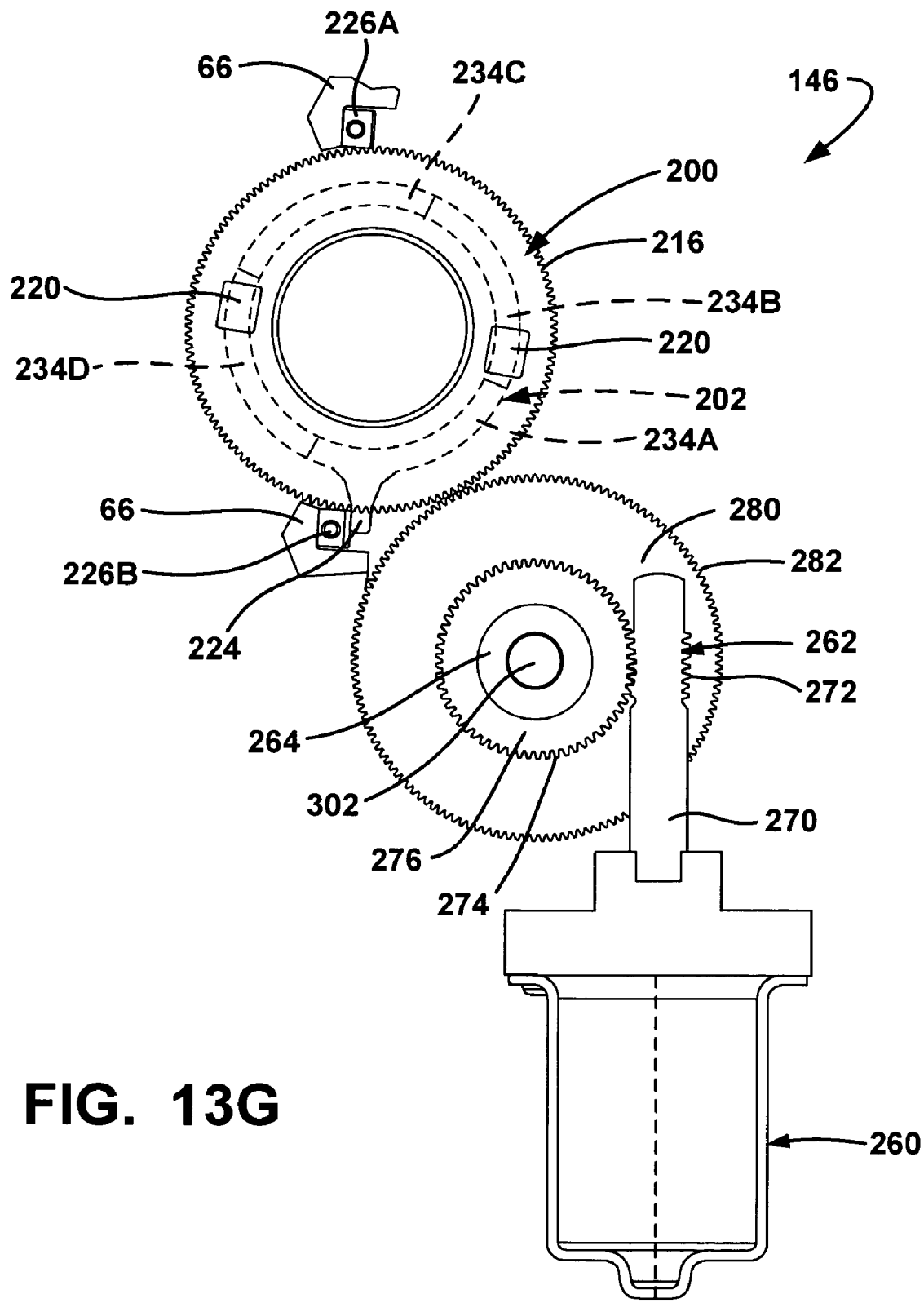

Referring primarily to FIG. 12, range actuator assembly 266 is shown to include a range cam 284 that is shown to be integrally formed at one end of actuator shaft 264 for common rotation therewith. As seen, position sensor 170 detects the rotated position of actuator shaft 264 for providing accurate control of the rotated position of drive gear 280 and range cam 284. Range cam 284 is generally similar to range cam 172 in that its groove 173 includes a high-range dwell segment 174, a low-range dwell segment 176 and an intermediate spiral shift segment 178 therebetween.

Range actuator assembly 266 further includes a range fork 290 having a follower segment 292 with a follower 294 extending into range cam groove 173, a shift fork segment 296 and a spring-biasing unit 298 therebetween. As seen, shift fork segment 296 includes a yoke portion 300 extending into annular groove 190 in shift collar 84. Rotation of range cam 284 results in axial movement of follower segment 292 due to movement of follower 294 within shift segment 178 of groove 173 in range cam 284. Such movement of follower segment 292 causes biasing unit 298 to load fork segment 296 to move axially for causing corresponding movement of shift collar 84. As seen, range actuator assembly 266 is supported for sliding movement on a support rail 302 that has one end retained in a socket 304 formed in housing 66 and its opposite end disposed in a cylindrical bore 306 formed in actuator shaft 264. Follower segment 292 has a pair of lugs 308A and 308B defining apertures through which rail 302 extends. Likewise, shift fork segment 296 has a pair of lugs 310A and 310B defining apertures through which rail 302 extends. Spring biasing unit 298 includes a coil spring 312 having its ends engaging spring flanges 314 on follower segment 292 and spring flanges 316 on shift fork segment 296. Spring 312 functions to accommodate axial movement of follower segment 292 relative to fork segment 196 due to tooth block conditions while loading fork segment 296 to cause axial movement thereof once the tooth block condition has been eliminated.

Figure 9:
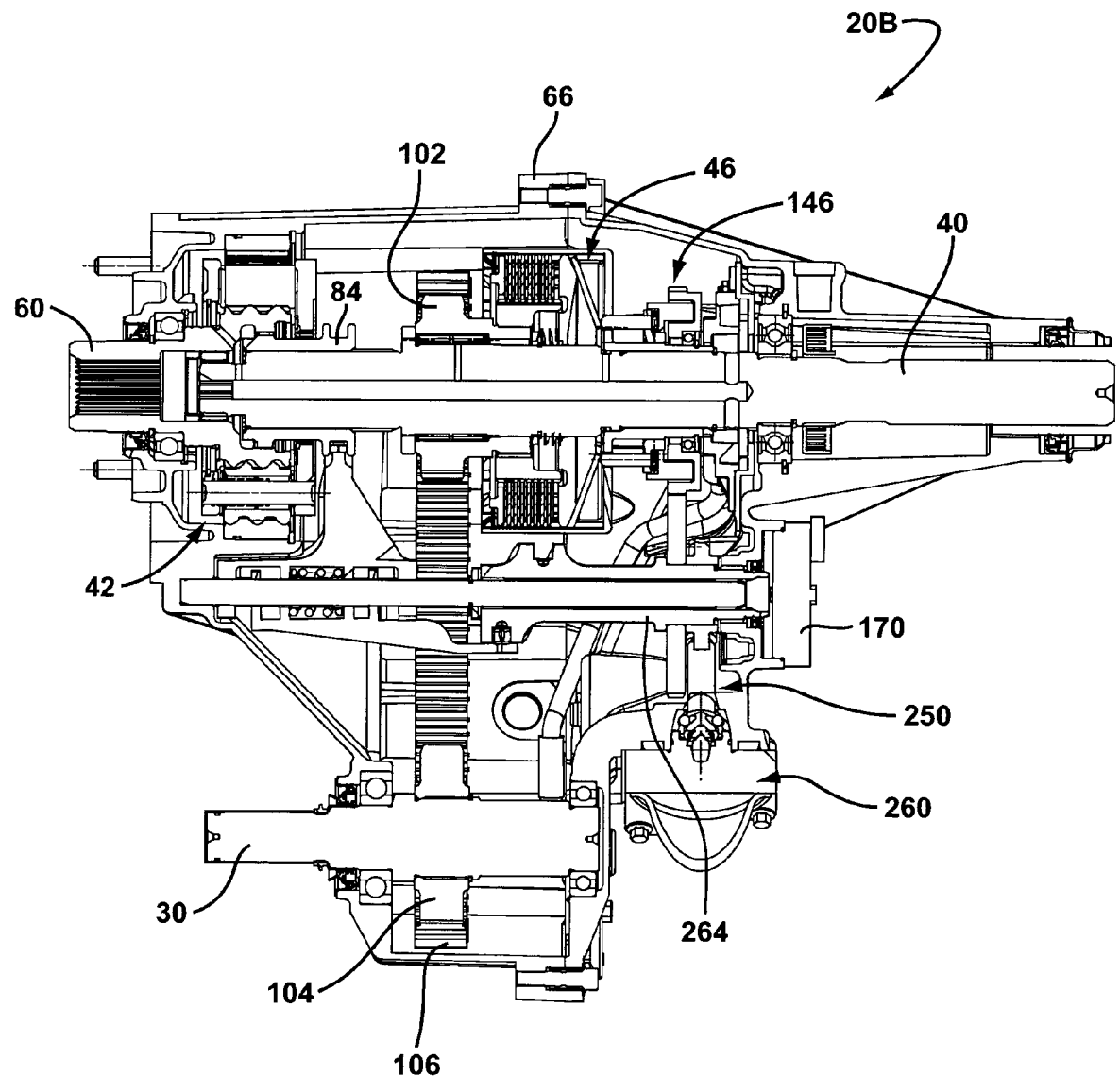
FIG. 9 is a sectional view of a two-speed on-demand transfer case according to another alternative embodiment of the present invention.
Figure 10:
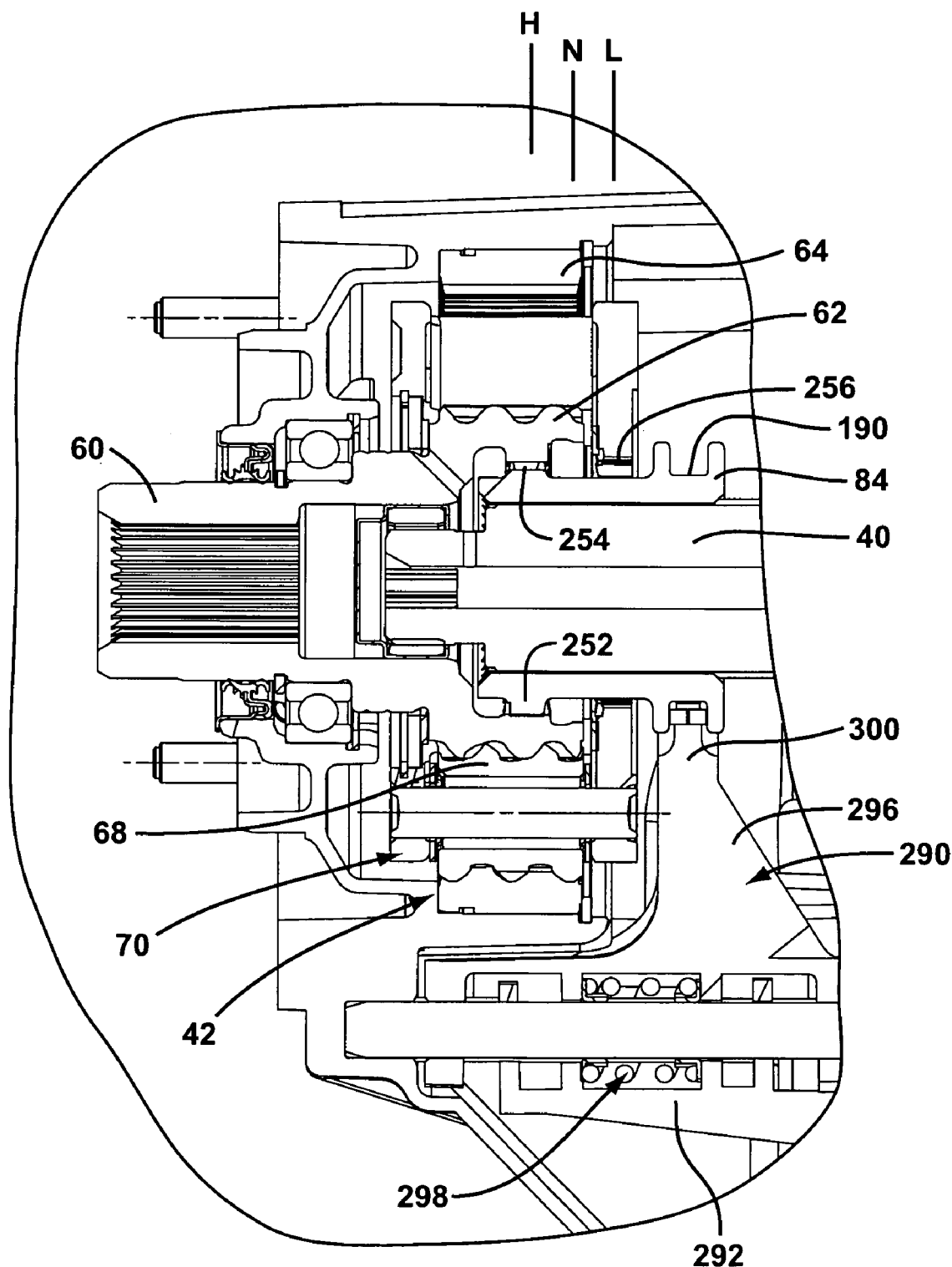
FIGS. 10-12 are enlarged partial views of FIG. 9 showing various components of the two-speed on-demand transfer case in greater detail.

When on-demand transfer case 20B of FIG. 9 is used in association with vehicle 10 of FIG. 1, mode select mechanism 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a Neutral mode, and a part-time four-wheel low-range (LOCK-4WH) drive mode. Specifically, in the 2WH drive mode, actuator shaft 264 would be rotated to the position shown in FIG. 13A. As such, range cam 284 locates shift collar 84 in its H range position and mode clutch assembly 46 is released such that all drive torque is delivered to rear output shaft 40. In the AUTO-4WH mode, shift collar 84 is located in its H range position and mode clutch assembly 46 is continuously modulated based on the value of the sensor signals to vary the torque distribution ratio between rear output shaft 40 and front output shaft 30 in a range between 100:0 and 50:50. This on-demand drive mode is established by controlling rotation of actuator shaft 264 such that rotation of control gear 200 causes rollers 200 to ride along cam surfaces 234A and 234C between the positions shown in FIGS. 13B and 13C. As previously noted, such action causes axial movement of cam member 202 between its adapt and extended positions for adaptively controlling the drive torque transferred across mode clutch 46. In the LOCK-4WH mode, actuation mechanism 250 rotates actuator shaft 264 to the position shown in FIG. 13C, whereby shift collar 84 is still located in its H range position and mode clutch assembly 46 is fully engaged to effectively couple front output shaft 30 to rear output shaft 40. Selection of the Neutral mode causes actuator mechanism 250 to rotate actuator shaft 264 to the position shown in FIG. 13D, whereby no drive torque is transferred to rear driveshaft 40. When the LOCK-4WL mode is selected, ECU 56 controls actuation mechanism 250 to rotate actuator shaft 264 to the position shown in FIG. 13G, whereby shift collar 84 is located in its L range position while fully engaging mode clutch assembly 46.

The above referenced embodiments clearly set forth the novel and unobvious features, structure and/or function of the present invention. However, one skilled in the art will appreciate that equivalent elements and/or arrangements made be used which will be covered by the scope of the following claims.

What is claimed is:

1. A transfer case comprising:
   an input shaft;
   first and second output shafts;
   a range unit driven at a reduced speed relative to said input shaft;
   a range clutch operable in a first range position to establish a drive connection between said input shaft and said first output shaft and further operable in a second range position to establish a drive connection between said range unit and said first output shaft;
   a mode clutch operable in a first mode position to disengage said second output shaft from driven engagement with said first output shaft and further operable in a second mode position to establish a drive connection between said first output shaft and said second output shaft;
   a worm gearset having a worm driving a worm gear;
   a motor driving said worm;
   an actuator shaft driven by said worm gear;
   a range actuator driven by said actuator shaft for moving said range clutch between its first and second range positions;
   a mode actuator driven by said actuator shaft for moving said mode clutch between its first and second mode positions; and
   a control system for actuating said motor to control the magnitude and direction of rotation of said actuator shaft so as to coordinate movement of said range clutch and said mode clutch, said actuator shaft is rotatable through three distinct ranges of travel wherein a first range of travel causes said range actuator to move said range clutch between its first and second range positions while said mode actuator maintains said mode clutch in its first mode position, and wherein a second range of travel causes said range actuator to maintain said range clutch in its first range position while said mode actuator moves said mode clutch between its first and second mode positions.

2. The transfer case of claim 1 wherein rotation of said actuator shaft through a third range of travel causes said range actuator to maintain said range clutch in its second range position while said mode actuator moves said mode clutch between its first and second mode positions.

3. The transfer case of claim 1 wherein said first range of rotary travel of said actuator shaft equals about 180° and said second range of rotary travel of said actuator shaft equals about 90°.

4. The transfer case of claim 1 wherein said worm includes worm threads formed on a shaft driven by said motor that are meshed with worm teeth on said worm gear, and wherein said worm gear is fixed to said actuator shaft for driving a drive gear that is operable to drive said mode actuator.

5. The transfer case of claim 1 wherein said range actuator comprises:
   a range cam fixed for rotation with said actuator shaft;
   a shift fork coupled to said range clutch; and
   a mechanism interconnecting said shift fork to said range cam which is operable to convert rotary movement of said range cam into axial movement of said shift fork for moving said range clutch between its first and second range positions.

6. The transfer case of claim 5 wherein said mechanism includes a follower secured to said shift fork which extends into a groove formed in said range cam, said groove including a first dwell segment, a second dwell segment and a shift segment interconnecting said first and second dwell segments, said shift segment is configured to cause axial movement of said range clutch between its first and second range positions during rotation of said actuator shaft through a first range of rotary travel, said first dwell segment is configured to maintain said range clutch in its first range position during rotation of said actuator shaft through a second range of rotary travel, and said second dwell segment is configured to maintain said range clutch in its second range position during rotation of said actuator shaft through a third range of rotary travel.

7. The transfer case of claim 1 wherein said mode actuator comprises:
   a control gear rotatably driven by a drive gear fixed to said actuator shaft;
   a cam member having a first cam surface, a second cam surface and an anti-rotation lug; and
   a roller disposed between said control gear and said cam member that is adapted to engage said first and second cam surfaces, wherein said mode clutch is moveable between its first and second mode positions in response to movement of said cam member between a retracted position and an extended position relative to said control gear.

8. The transfer case of claim 7 wherein rotation of said drive gear within a first range of rotary travel causes corresponding rotation of said control gear through a first range of rotary travel, and wherein rotation of said control gear through its first range of rotary travel causes concurrent rotary movement of said cam member while said cam member is maintained in its retracted position.

9. The transfer case of claim 8 wherein rotation of said drive gear within a second range of rotary travel cause corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation cause said roller to ride on said first cam surface and forcibly move said cam member between its retracted and extended positions.

10. The transfer case of claim 9 wherein rotation of said drive gear within a third range of rotary travel cause corresponding rotation of said control gear through a third range of rotary travel, and wherein rotation of said control gear through its third range of rotary travel cause said anti-rotation lug on said cam member to engage a second anti-rotation stop such that said control gear rotates relative to said cam member, whereby such relative rotation cause said roller to ride on said second cam surface and axially move said cam member between its retracted and extended positions.

11. A transfer case comprising:
    an input shaft;
    first and second output shafts;
    a range unit driven by said input shaft and having an output component driven at a reduced speed relative to said input shaft;
    a dog clutch operable in a first range position to couple said input shaft to said first output shaft for establishing a high-range drive connection, said dog clutch is further operable in a second range position to couple said output component of said range unit to said first output shaft for establishing a low-range drive connection;
    a mode clutch including a clutch pack operably disposed between said first and second output shafts and a pressure plate moveable between a first mode position whereat a minimum clutch engagement force is exerted on said clutch pack and a second mode position whereat a maximum clutch engagement force is exerted on said clutch pack; and
    an actuation mechanism including a worm gearset driving an actuator shaft, a motor driving said worm gearset, a range actuator driven by said actuator shaft for moving said dog clutch between its first and second range positions, and a mode actuator driven by said actuator shaft for moving said pressure plate between its first and second mode positions, said actuator shaft being rotatable through three distinct ranges of rotary travel for causing said range and mode actuators to coordinate movement of said dog clutch and said pressure plate, wherein said actuator shaft is rotatable through a first range of travel for causing said range actuator to move said dog clutch between its first and second range positions while said mode actuator maintains said pressure plate in its first mode position, wherein said actuator shaft is rotatable through a second range of travel for causing said range actuator to maintain said dog clutch in its first range position while said mode actuator moves said pressure plate between its first and second mode positions, and wherein said actuator shaft is rotatable through a third range of travel for causing said range actuator to maintain said dog clutch in its second range position while said mode actuator moves said pressure plate between its first and second mode positions.

12. The transfer case of claim 11 wherein said first range of rotary travel of said actuator shaft equals about 180° and said second and third ranges of rotary travel of said actuator shaft each equal about 90°.

13. The transfer case of claim 11 wherein said mode actuator assembly comprises:
    a drive gear fixed for rotation with said actuator shaft;
    a control gear driven by said drive gear;
    a cam member having a first cam surface, a second cam surface and an anti-rotation lug;
    a roller mounted to said control gear and adapted to engage either of said first and second cam surfaces; and
    a thrust member for causing axial movement of said pressure plate between its first and second mode positions in response to axial movement of said cam member between a retracted position and an extended position relative to said control gear.

14. The transfer case of claim 13 wherein rotation of said drive gear with said actuator shaft within its first range of rotary travel causes corresponding rotation of said control gear through a first range of rotary travel, and wherein rotation of said control gear through its first range of rotary travel causes concurrent rotary movement of said cam member while said cam member is maintained in its retracted position.

15. The transfer case of claim 14 wherein rotation of said drive gear with said actuator shaft within its second range of rotary travel causes corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation causes said roller to ride on said first cam surface and forcibly move said cam member between its retracted and extended positions so as to cause corresponding movement of said pressure plate.

16. The transfer case of claim 15 wherein rotation of said drive gear with said actuator shaft within its third range of rotary travel causes corresponding rotation of said control gear through a third range of rotary travel, and wherein rotation of said control gear through its third range of rotary travel causes said anti-rotation lug on said cam member to engage a second anti-rotation stop such that said control gear rotates relative to said cam member, whereby such relative rotation causes said roller to ride on said second cam surface and axially move said cam member between its retracted and extended positions so as to cause corresponding movement of said pressure plate.

17. A transfer case comprising:
an input shaft;
first and second output shafts;
a range unit driven at a reduced speed relative to said input shaft;
a range clutch operable in a first range position to establish a drive connection between said input shaft and said first output shaft and further operable in a second range position to establish a drive connection between said range unit and said first output shaft;
a mode clutch operable in a first mode position to release said second output shaft from driven engagement with said first output shaft and further operable in a second mode position to establish a drive connection between said first and second output shafts;
an actuator shaft disposed between said first and second output shafts;
a range cam fixed for rotation with said actuator shaft;
a drive gear fixed for rotation with said actuator shaft;
a worm gearset having a worm gear fixed for rotation with said actuator shaft;
a motor driving said worm gearset to control rotation of said actuator shaft;
a range actuator assembly operably disposed between said range cam and said range clutch for controlling movement of said range clutch between its first and second range positions in response to rotation of said range cam;
a mode actuator assembly having a control gear meshed with said drive gear and a cam unit operable for controlling movement of said mode clutch between its first and second mode positions in response to rotation of said control gear; and
a control system for controlling actuation of said motor to control the amount and direction of rotation of said actuator shaft to coordinate movement of said range clutch and said mode clutch.

18. The transfer case of claim 17 wherein rotation of said actuator shaft through a first range of travel causes said range actuator to move said range clutch between its first and second range positions while said mode actuator maintains said mode clutch in its first mode position, and wherein rotation of said actuator shaft through a second range of travel causes said range actuator to maintain said range clutch in its first range position while said mode actuator moves said mode clutch between its first and second mode positions.

19. The transfer case of claim 18 wherein rotation of said actuator shaft through a third range of travel causes said range actuator to maintain said range clutch in its second range position while said mode actuator moves said mode clutch between its first and second mode positions.

20. The transfer case of claim 19 wherein said first range of rotary travel of said actuator shaft equals about 180° and said second range of rotary travel of said actuator shaft equals about 90°.

21. The transfer case of claim 17 wherein said range actuator comprises:
a range cam fixed for rotation with said actuator shaft;
a shift fork coupled to said range clutch; and
a mechanism interconnecting said shift fork to said range cam which is operable to convert rotary movement of said range cam into axial movement of said shift fork for moving said range clutch between its first and second range positions.

22. The transfer case of claim 21 wherein said mechanism includes a follower secured to said shift fork which extends into a groove formed in said range cam, said groove including a first dwell segment, a second dwell segment and a shift segment interconnecting said first and second dwell segments, said shift segment is configured to cause axial movement of said range clutch between its first and second range positions during rotation of said actuator shaft through a first range of rotary travel, said first dwell segment is configured to maintain said range clutch in its first range position during rotation of said actuator shaft through a second range of rotary travel, and said second dwell segment is configured to maintain said range clutch in its second range position during rotation of said actuator shaft through a third range of rotary travel.

23. The transfer case of claim 17 wherein said mode actuator comprises:
a control gear rotatably driven by a drive gear fixed to said actuator shaft;
a cam member having a first cam surface, a second cam surface and an anti-rotation lug; and
a roller disposed between said control gear and said cam member that is adapted to engage said first and second cam surfaces, wherein said mode clutch is moveable between its first and second mode positions in response to movement of said cam member between a retracted position and an extended position relative to said control gear.

24. The transfer case of claim 23 wherein rotation of said drive gear within a first range of rotary travel causes corresponding rotation of said control gear through a first range of rotary travel, and wherein rotation of said control gear through its first range of rotary travel causes concurrent rotary movement of said cam member while said cam member is maintained in its retracted position.

25. The transfer case of claim 24 wherein rotation of said drive gear within a second range of rotary travel cause corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation cause said roller to ride on said first cam surface and forcibly move said cam member between its retracted and extended positions.

26. The transfer case of claim 25 wherein rotation of said drive gear within a third range of rotary travel cause corresponding rotation of said control gear through a third range of rotary travel, and wherein rotation of said control gear through its third range of rotary travel cause said anti-rotation lug on said cam member to engage a second anti-rotation stop such that said control gear rotates relative to said cam member, whereby such relative rotation cause said roller to ride on said second cam surface and axially move said cam member between its retracted and extended positions.

27. A transfer case comprising:
an input shaft;
a range unit driven at a reduced speed relative to said input shaft;
a range clutch operable in a first range position to establish a drive connection between said input shaft and said first output shaft and further operable in a second range position to establish a drive connection between said range unit and said first output shaft;
a mode clutch operable in a first mode position to release said second output shaft from driven engagement with said first output shaft and further operable in a second mode position to establish a drive connection between said first output shaft and said second output shaft;
a motor;
an actuator shaft having a drive gear;
a worm gearset drivingly coupling said actuator shaft to said motor;
a range actuator driven by said actuator shaft for moving said range clutch between its first and second range positions;
a mode actuator having a control gear driven by said drive gear in response to rotation of said actuator shaft for moving said mode clutch between its first and second mode positions; and
a control system for actuating said motor to control the magnitude and direction of rotation of said actuator shaft.

28. The transfer case of claim 27 wherein said actuator shaft is rotatable through three distinct ranges of travel, wherein rotation of said actuator shaft through a first range of travel causes said range actuator to move said range clutch between its first and second range positions while said mode actuator maintains said mode clutch in its first mode position, wherein rotation of said actuator shaft through a second range of travel causes said range actuator to maintain said range clutch in its first range position while said mode actuator moves said mode clutch between its first and second mode positions and wherein rotation of said actuator shaft through a third range of travel causes said range actuator to maintain said range clutch in its second range position while said mode actuator moves said mode clutch between its first and second mode positions.

29. The transfer case of claim 27 wherein said mode actuator includes a cam mechanism operably disposed between said control gear and said mode clutch.

30. A transfer case comprising:
an input shaft;
first and second output shafts;
a differential having an input component, a first output component driving said first output shaft and a second output component driving said second output shaft;
a range unit driven at a reduced speed relative to said input shaft;
a range clutch operable in a first range position to establish a drive connection between said input shaft and said input component and further operable in a second range position to establish a drive connection between said range unit and said input component;
a mode clutch disposed between any two of said input component and first and second output components of said differential, said mode clutch is operable in a first mode position to permit speed differentiation between said first and second output shafts and is further operable in a second mode position to inhibit speed differentiation between said first and second output shafts;
an actuator shaft having a drive gear;
a motor;
a worm gearset drivingly coupling said motor to said actuator shaft;
a range actuator driven by said actuator shaft for controlling movement of said range clutch between its first and second range positions;
a mode actuator having a control gear meshed with said drive gear for controlling movement of said mode clutch between its first and second mode positions in response to rotation of said control gear; and
a control system for controlling actuation of said motor to control the amount and direction of rotation of said actuator shaft so as to coordinate movement of said range clutch and said mode clutch.

* * * * *